(12) United States Patent
Saenz et al.

(10) Patent No.: US 12,112,620 B2
(45) Date of Patent: Oct. 8, 2024

(54) STREETLIGHT SITUATIONAL AWARENESS SYSTEM

(71) Applicant: LHP, Inc., Columbus, IN (US)

(72) Inventors: Adam Joseph Saenz, Chino, CA (US); Victor Hugo Aguilar, Downey, CA (US); Armando Silvestre Hernandez-Urena, Los Angeles, CA (US); Steven Joseph Neemeh, Yorba Linda, CA (US)

(73) Assignee: LHP, Inc., Columbus, IN (US)

( * ) Notice: Subject to any disclaimer, the term of this patent is extended or adjusted under 35 U.S.C. 154(b) by 380 days.

(21) Appl. No.: 17/650,605

(22) Filed: Feb. 10, 2022

(65) Prior Publication Data

US 2022/0254250 A1 Aug. 11, 2022

Related U.S. Application Data

(60) Provisional application No. 63/200,021, filed on Feb. 10, 2021.

(51) Int. Cl.
*G06K 9/00* (2022.01)
*F21S 8/08* (2006.01)
(Continued)

(52) U.S. Cl.
CPC ............ *G08G 1/0116* (2013.01); *F21S 8/085* (2013.01); *G06T 7/292* (2017.01); *G06V 20/54* (2022.01); *G06V 20/625* (2022.01); *G08G 1/04* (2013.01); *G08G 1/087* (2013.01); *G08G 1/091* (2013.01); *G06T 2207/30232* (2013.01); *G06T 2207/30236* (2013.01); *G06T 2207/30241* (2013.01); *G06V 2201/08* (2022.01)

(58) Field of Classification Search
CPC ........................................................ G06T 7/292
See application file for complete search history.

(56) References Cited

U.S. PATENT DOCUMENTS 6,462,775 B1 10/2002 Loyd et al.
8,140,276 B2 3/2012 Walters et al.
(Continued)

FOREIGN PATENT DOCUMENTS

KR 20140128522 A 11/2014
KR 20200050231 A 5/2020
(Continued)

OTHER PUBLICATIONS

PCT, Int. App. No. PCT/US2022/070610 International Search Report (ISR), 4 pages, May 20, 2022.
(Continued)

*Primary Examiner* — Hadi Akhavannik
(74) *Attorney, Agent, or Firm* — Woodard, Emhardt, Henry, Reeves & Wagner, LLP

(57) ABSTRACT

A streetlight situational awareness system (SSAS) includes streetlight modules integrated into streetlights. Each module includes a camera configured to detect objects within a predetermined zone along a road. The awareness module includes a lamp array configured to illuminate an area around the streetlight. The system includes a communication network configured to share data about objects within the zone with nearby vehicles and/or neighboring streetlight modules.

23 Claims, 20 Drawing Sheets

(51) Int. Cl.
*G06T 7/292* (2017.01)
*G06V 20/54* (2022.01)
*G06V 20/62* (2022.01)
*G08G 1/01* (2006.01)
*G08G 1/04* (2006.01)
*G08G 1/087* (2006.01)
*G08G 1/09* (2006.01)

(56) References Cited

U.S. PATENT DOCUMENTS

| | | | |
|---|---|---|---|
| 9,224,293 | B2 | 12/2015 | Taylor |
| 10,354,265 | B2* | 7/2019 | Patsiokas ........... G06Q 30/0261 |
| 10,429,046 | B2 | 10/2019 | Zhao et al. |
| 10,667,373 | B2 | 5/2020 | Cartmill et al. |
| 10,691,958 | B1 | 6/2020 | Fink et al. |
| 10,950,118 | B2 | 3/2021 | Brown et al. |
| 11,041,617 | B2 | 6/2021 | Adejumo et al. |
| 11,149,926 | B2 | 10/2021 | Stegeman et al. |
| 11,204,156 | B2 | 12/2021 | Stegeman et al. |
| 2014/0278052 | A1 | 9/2014 | Slavin et al. |
| 2015/0362172 | A1 | 12/2015 | Gabriel et al. |
| 2017/0032402 | A1* | 2/2017 | Patsiokas ........... G06Q 30/0207 |
| 2018/0025550 | A1* | 1/2018 | Hudson .................. G07B 15/02 705/13 |
| 2018/0182111 | A1* | 6/2018 | Shinohara ............. G03B 15/02 |
| 2019/0228654 | A1* | 7/2019 | Olsen ............... G08G 1/096716 |
| 2020/0175289 | A1* | 6/2020 | May ..................... G06V 20/584 |
| 2020/0233422 | A1 | 7/2020 | Song et al. |
| 2021/0261152 | A1* | 8/2021 | Meijburg ................ H04W 4/38 |

FOREIGN PATENT DOCUMENTS

| | | |
|---|---|---|
| KR | 20200117648 A | 10/2020 |
| KR | 20210012282 A | 2/2021 |
| WO | 2017184636 A1 | 10/2017 |

OTHER PUBLICATIONS

PCT, Int. App. No. PCT/US2022/070610 Written Opinion (WO) of International Search Authority, 4 pages, May 20, 2022.

* cited by examiner

STREETLIGHT SITUATIONAL AWARENESS SYSTEM

CROSS REFERENCE TO RELATED APPLICATIONS

This application claims the benefit of U.S. Patent Application No. 63/200,021, filed Feb. 10, 2021, which is hereby incorporated by reference.

BACKGROUND

Autonomous vehicles are becoming more and more common. Unfortunately, there are challenges holding autonomous vehicles back from becoming mainstream. For example, autonomous vehicles are currently able to operate up to level 3 on the autonomous vehicle scale. In some instances, vehicles area able to reach levels 4 and 5 on the autonomous vehicle scale. However, level 3 autonomous driving still requires human intervention in some instances. Additionally, levels 4 and 5 autonomous driving is limited as vehicles are generally unable to detect and/or react to hazards outsize of a predetermined line of sight. As should be appreciated, the inability to sense objects outside of a predetermined area can result in accidents and/or injuries.

Thus, there is a need for improvement in this field.

SUMMARY

A unique streetlight or streetlamp situational awareness system (SSAS) has been developed to address the above mentioned as well as other issues. The situational awareness system includes an awareness module configured to detect one or more objects within a predetermined zone. In one embodiment, the awareness module is retrofittable into an existing streetlamp housing. The awareness module includes a camera, a lamp array, a positioning system, and a communication network in communication with a processor. The processor is configured to perform object detection and tracking processes based on input from the camera. The communication network includes an intranet communication network and an extranet communication network. The intranet communication network is configured to send object detection information between one or more awareness modules. The extranet communication network is configured to send object detection information between the awareness module and one or more vehicles within the situational awareness system. In one example, the vehicles are autonomous vehicles.

The situational awareness system is configured to operate in a variety of modes and/or perform a variety of functions. In one embodiment, the awareness system functions as a traffic monitoring system. For example, the awareness module monitors traffic conditions and reports the traffic conditions to one or more vehicles and/or a route planning system. In another embodiment, the awareness system functions as a hazard alert system. For example, the awareness module monitors for an accident, fire, and/or other hazard. Once a hazard is detected, the awareness system generates an alert and/or contacts the proper emergency services. In yet another embodiment, the awareness system acts as a warning system for a vehicle. For example, the awareness system monitors a sidewalk and/or road for one or more objects, such as children, animals, and/or bicycles. The awareness system calculates the position of the object and transfers the object detection information to a vehicle. As should be appreciated, the object detection information is used by the vehicle to avoid accidents. Additionally, the vehicle is able to offload processing power from the vehicle to the situational awareness system. For example, the vehicle analyzes an area within a direct line of sight of the vehicle for hazards and/or objects, while the situational awareness system monitors an area around the vehicle for hazards and/or objects outside of the line of sight of the vehicle. The situational awareness system may then transfer the hazard and/or object detection data to the vehicle.

The system and techniques as described and illustrated herein concern a number of unique and inventive aspects. Some, but by no means all, of these unique aspects are summarized below.

Aspect 1 generally concerns a system.

Aspect 2 generally concerns the system of any previous aspect that includes a streetlight situational awareness system (SSAS).

Aspect 3 generally concerns the system of any previous aspect that includes one or more streetlight modules configured to visually monitor corresponding zones along a road.

Aspect 4 generally concerns the system of any previous aspect in which the streetlight modules are each integrated into a streetlight configured to illuminate the road.

Aspect 5 generally concerns the system of any previous aspect in which the streetlight modules each include a camera configured to visually monitor the zones.

Aspect 6 generally concerns the system of any previous aspect in which the camera is configured to visually monitor the zones from above the road.

Aspect 7 generally concerns the system of any previous aspect in which the camera has a field of view defining a boundary of the zone for the streetlight module.

Aspect 8 generally concerns the system of any previous aspect in which a dual communication network is configured to communicate object data from the streetlight modules.

Aspect 9 generally concerns the system of any previous aspect in which an intranet communication network is configured to communicate the object data between the streetlight modules.

Aspect 10 generally concerns the system of any previous aspect in which an extranet communication network is configured facilitate communications between the streetlight modules and a vehicle.

Aspect 11 generally concerns the system of any previous aspect in which the extranet communication network is configured to facilitate one-way broadcast communications from the streetlight modules to the vehicle.

Aspect 12 generally concerns the system of any previous aspect in which the extranet communication network is configured to facilitate two-way communications between the streetlight modules and the vehicle.

Aspect 13 generally concerns the system of any previous aspect in which the streetlight modules are configured to monitor traffic congestion within the zones along the road.

Aspect 14 generally concerns the system of any previous aspect in which the streetlight modules are configured to alert emergency services when a hazard is detected along the road.

Aspect 15 generally concerns the system of any previous aspect in which the streetlight modules are configured to generate an alert if an unsafe event is detected along the road.

Aspect 16 generally concerns the system of any previous aspect in which the streetlight modules are configured to track objects when moving between the zones.

Aspect 17 generally concerns the system of any previous aspect in which the streetlight modules are configured to alert a vehicle when at least one of the objects is moving towards a travel path of the vehicle.

Aspect 18 generally concerns the system of any previous aspect in which the vehicle includes an autonomous vehicle.

Aspect 19 generally concerns the system of any previous aspect in which the streetlight modules are configured to monitor the zones for a vehicle matching an amber alert description.

Aspect 20 generally concerns the system of any previous aspect in which the streetlight modules are configured to monitor license plates of vehicles via the camera to detect the vehicle matching the amber alert description.

Aspect 21 generally concerns the system of any previous aspect in which the base station configured to store object data from the streetlight modules.

Aspect 22 generally concerns the system of any previous aspect in which the streetlight modules are configured to manage traffic along the road via one or more traffic lights.

Aspect 23 generally concerns a method.

Aspect 24 generally concerns the system or method of any previous aspect including monitoring visually a first zone of a road with a first streetlight module.

Aspect 25 generally concerns the system or method of any previous aspect including monitoring visually a second zone of the road with a second streetlight module.

Aspect 26 generally concerns the system or method of any previous aspect in which the streetlight modules are part of the streetlight situational awareness system (SSAS).

Aspect 27 generally concerns the system or method of any previous aspect including tracking with the system an object as the object moves between the first zone and the second zone with the streetlight modules.

Aspect 28 generally concerns the system or method of any previous aspect including detecting a potential collision with the system by monitoring a travel path of the object with the streetlight modules.

Aspect 29 generally concerns the system or method of any previous aspect including issuing an alert upon the detecting of the potential collision.

Aspect 30 generally concerns the system or method of any previous aspect in which the object includes a vehicle.

Aspect 31 generally concerns the system or method of any previous aspect including reading a license plate of the vehicle with the first streetlight module.

Aspect 32 generally concerns the system or method of any previous aspect including determining with the system that the license plate matches a license plate identification for an amber alert.

Aspect 33 generally concerns the system of any previous aspect in which the streetlight modules are configured to visually monitor corresponding zones along a road and/or sidewalk.

Aspect 34 generally concerns the system of any previous aspect in which the streetlight modules are configured to visually monitor corresponding zones in an area around a road and/or sidewalk.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
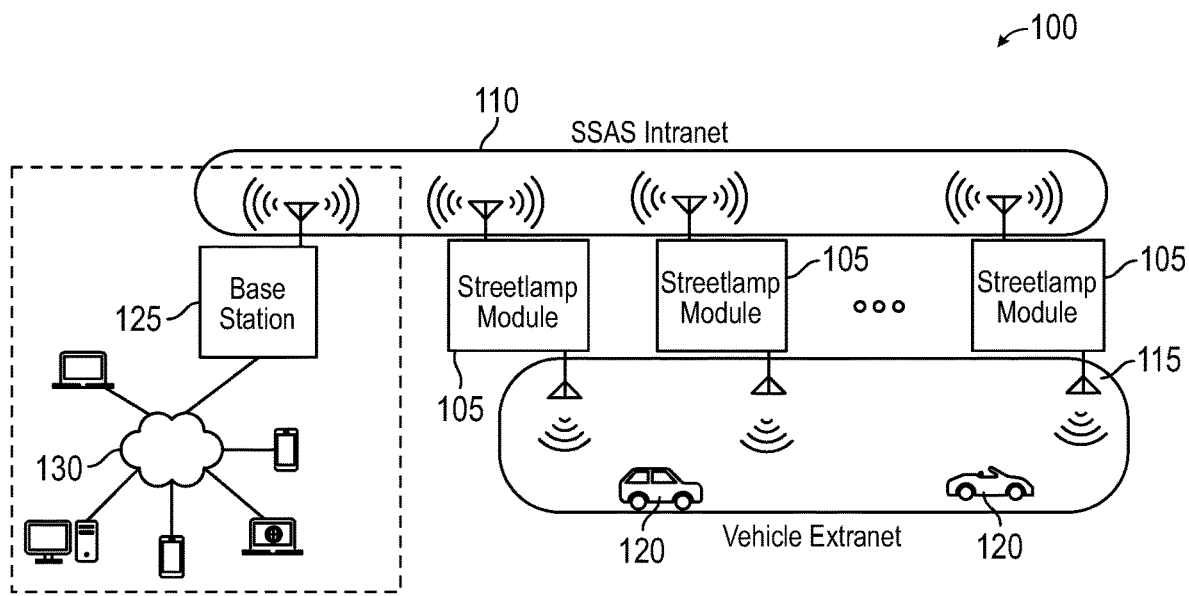
FIG. 1 is a diagrammatic view of a situational awareness system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows an example of a streetlight situational awareness system (SSAS) 100. The situational awareness system 100 is configured to monitor a predetermined zone for one or more objects. The objects may include bicycles, pedestrians, vehicles, animals, road hazards, and/or other objects. In another example, the situational awareness system 100 is configured to send object detection data to one or more vehicles to assist in preventing accidents. The situational awareness system 100 includes a streetlight module 105, an intranet communication network 110, and an extranet communication network 115. In one example, the streetlight module 105 is a component of a streetlamp. In another example, the streetlight module 105 is mounted to buildings, traffic lights, and/or similar structures. In one embodiment, the streetlight module 105 replaces the current lighting system of the streetlamp. As should be appreciated, the streetlight module 105 is configured to retrofit an existing streetlamp without modification.

The intranet communication network 110 transfers information between the one or more streetlight modules 105. For example, the intranet communication network 110 transfers object detection data between the streetlight modules 105 within the situational awareness system 100 to assist in object tracking. The extranet communication network 115 transfers object detection data between one or more streetlight modules 105 and one or more vehicles 120. For example, the extranet communication network 115 transmits object detection data to one or more vehicles 120. As should be appreciated, the vehicle 120 uses object detection data to prevent accidents and/or dangerous circumstances.

In another embodiment, the situational awareness system 100 includes a base station 125. The base station 125 acts as a master controller for the situational awareness system 100. For example, the base station 125 maintains a database of past object detection data. In one example, the base station 125 communicates with a cloud storage device 130. The cloud storage device 130 may be accessed remotely by a computer and/or other computing device to monitor data from the situational awareness system 100.

Figure 2:
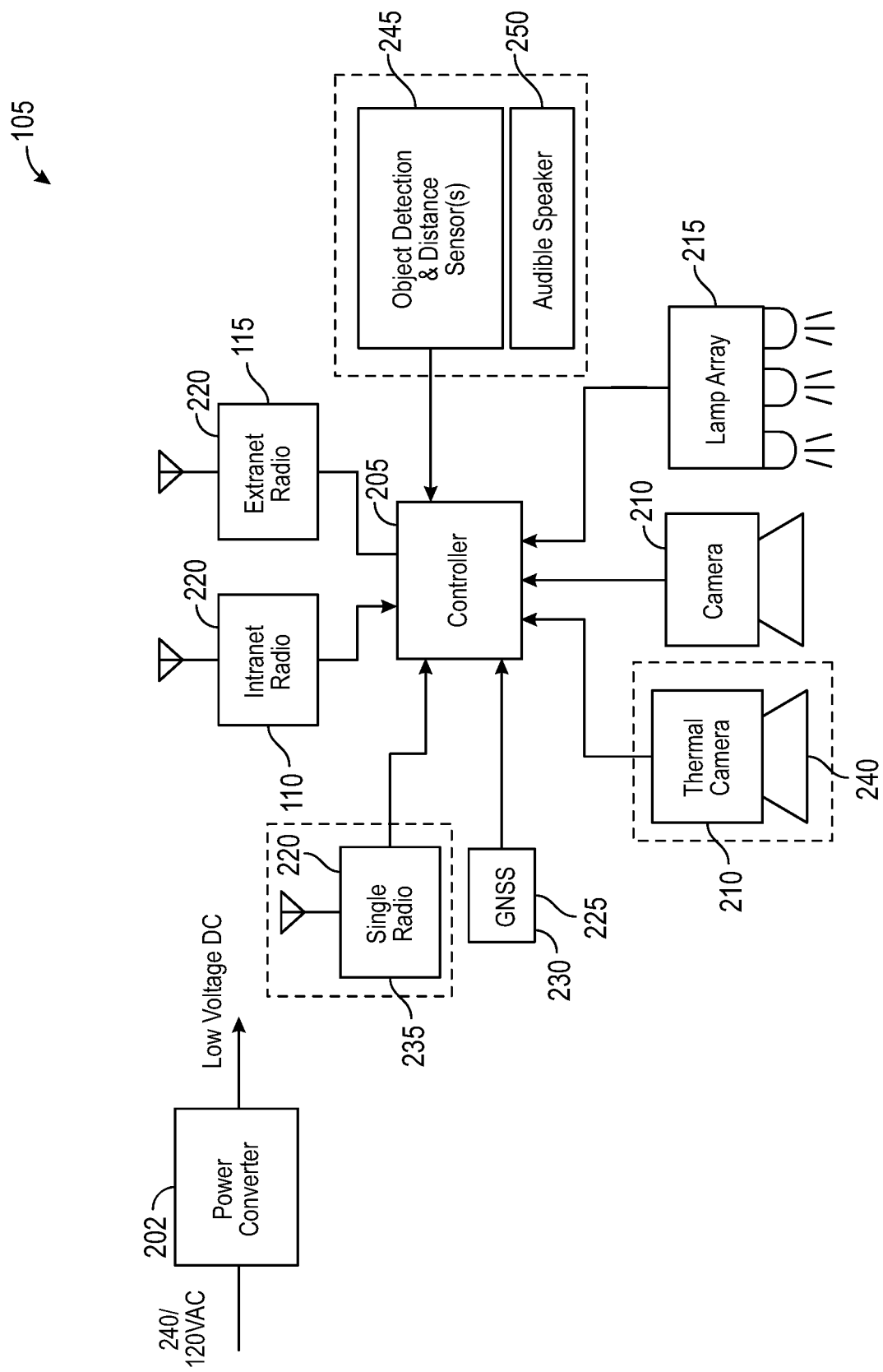
FIG. 2 is a diagrammatic view of a streetlight module of the situational awareness system of FIG. 1.

FIG. 2 shows components of the streetlight module 105. The streetlight module 105 includes a power converter 202, a controller 205, a camera 210, a lamp array 215, a communication network 220, and a position sensor 225. The power converter 202 converts alternating current (AC) voltage from the streetlamp into low voltage direct current (DC) voltage to power the streetlight module 105. The controller 205 detects, classifies, tracks, and reports objects within view of the camera 210. The controller 205 additionally maintains a database of objects tracked by the streetlight module 105. The controller 205 further establishes, maintains, and severs communication with one or more vehicles 120.

The camera 210 detects objects within the situational awareness system 100. In one example, the camera 210 is a black and white camera. In another example, the camera 210 is a color camera. In yet another example, the camera 210 is a thermal camera 240. As should be appreciated, the thermal camera 240 is more effective in low visibility conditions. The lamp array 215 is configured to provide light to illuminate an area around the streetlight module 105. The lamp array 215 includes one or more light emitting diodes (LEDS) to provide illumination. In one example, the LEDs are chip on board (COB) LEDs. In yet another example, the lamp array 215 includes halogen lights, high intensity discharge (HID) lights, and/or fluorescent lights.

The communication network 220 includes the intranet communication network 110 and the extranet communication network 115. As mentioned previously, the intranet communication network 110 enables communication between multiple streetlight modules 105 and the extranet communication network 115 enables communication from the streetlight modules 105 to one or more vehicles 120. In another example, the communication network 220 is a dual communication network 235. The dual communication network 235 enables communication between the streetlight modules 105 and one or more vehicles 120 within a single communication network 220. As should be appreciated, the dual communication network 235 is advantageous when cost savings is desired. The position sensor 225 is generally a global navigation satellite system 230. The position sensor 225 enables the streetlight module 105 to utilize a fixed position to provide accurate location data for object tracking.

In another embodiment, the streetlight module 105 includes one or more object detection sensors 245. In one example, the object detection sensors 245 are radio detection and ranging (RADAR) sensors, light detection and ranging (LIDAR) sensors, and/or other object detection sensors. In yet another embodiment, the streetlight module 105 includes a speaker 250. The speaker 250 is configured to emit an audible alarm and/or alert based on commands from the controller 205.

Figure 3:
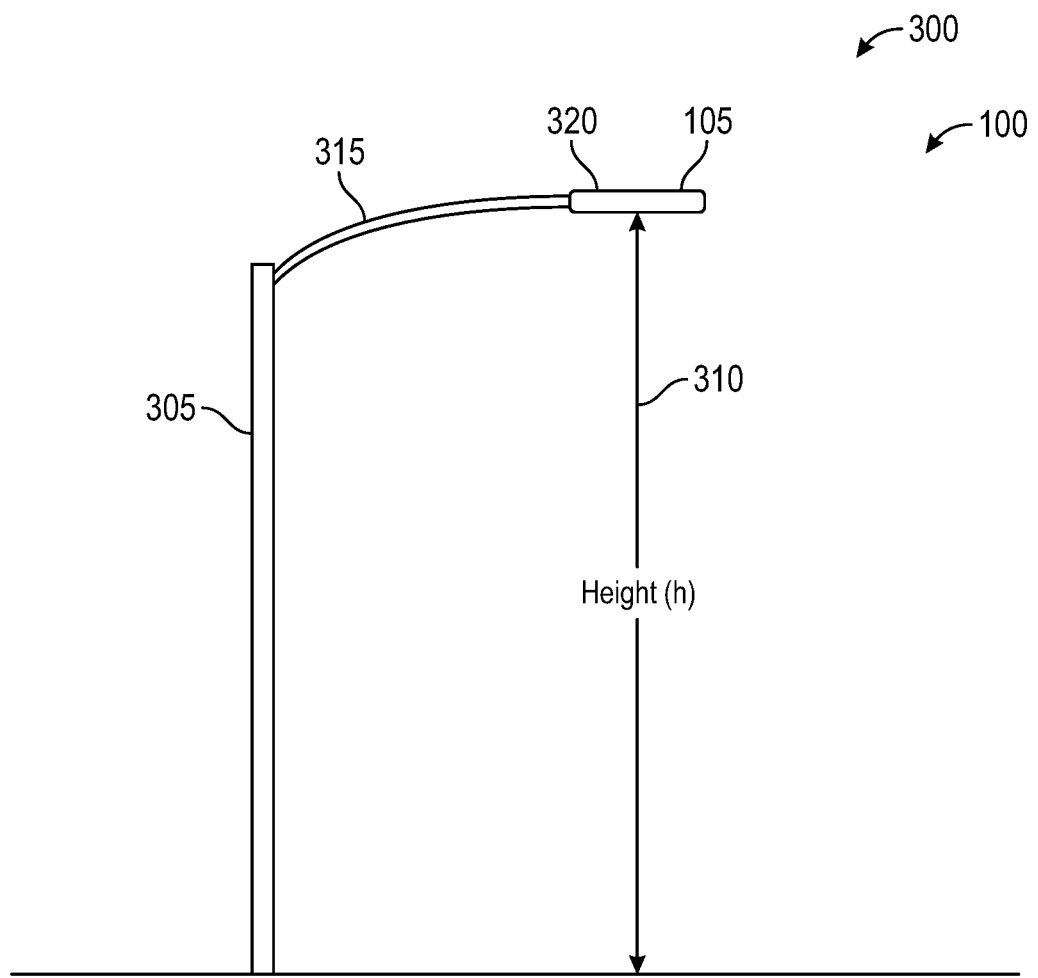
FIG. 3 is a side view of a streetlight.
Figure 4:
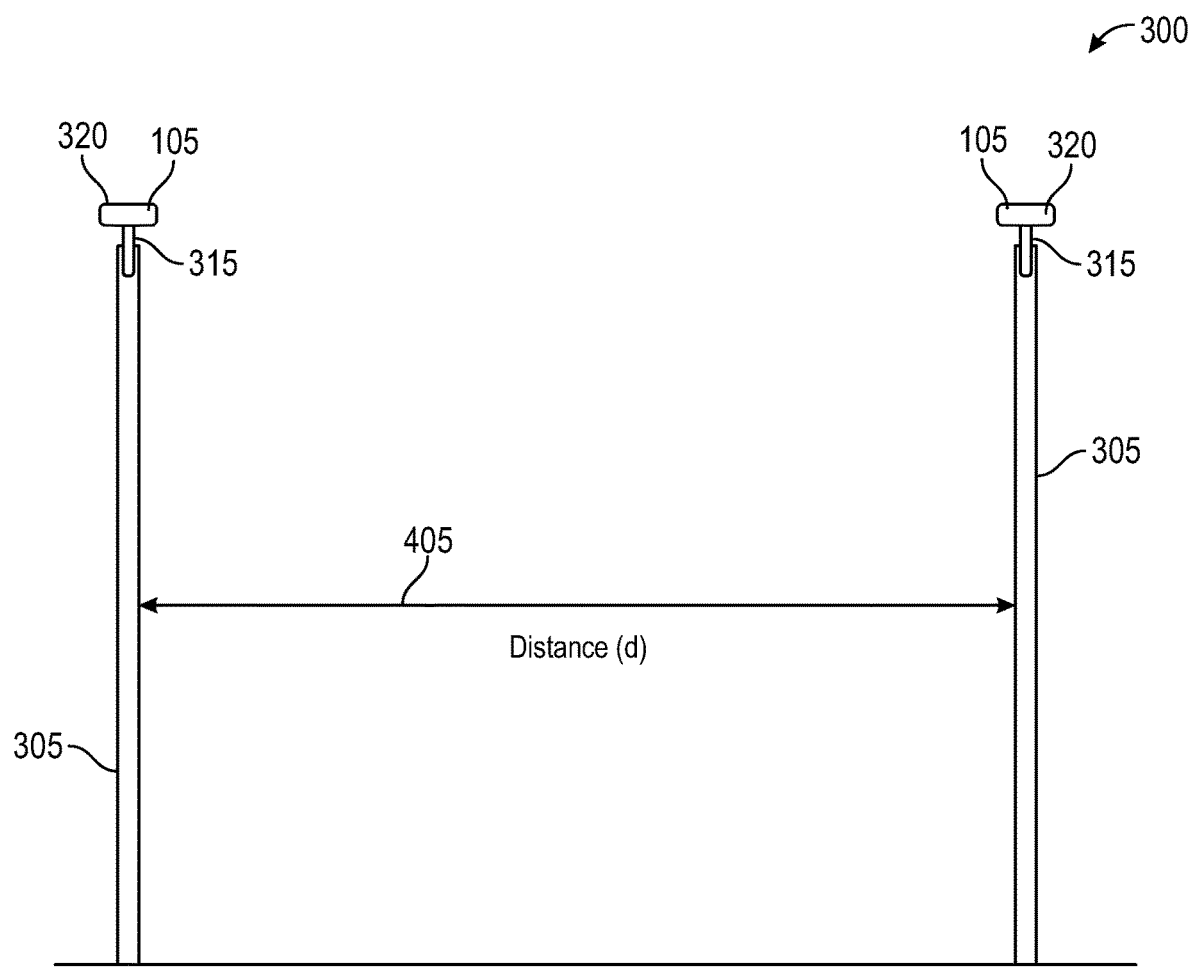
FIG. 4 is a front view of one or more streetlights of FIG. 3.

FIGS. 3 and 4 show an example of one or more streetlights 300 used with the situational awareness system 100. As has been mentioned previously, the streetlight module 105 is configured to mount within the streetlight 300. The streetlight 300 includes a post 305, an arm 315, and a housing 320. The post 305 has a height 310. The height 310 of the post 305 may be different for various models of streetlight 300. For example, the height 310 of the post 305 may be larger in urban areas. In another example, the height 310 of the post 305 may be shorter in rural areas. The arm 315 extends outward from the post 305. In some streetlights 300, the arm 315 may be absent. For example, the housing 320 may mount directly on top of the post 305. At one end of the arm 315 is the housing 320. The housing 320 is configured to hold the streetlight module 105. As should be appreciated, the housing 320 does not need to be replaced when installing the streetlight module 105. For example, the streetlight module 105 is configured to retrofit within an existing housing 320 without modification. The streetlights 300 are separated by a separation distance 405. The separation distance 405 is variable based on each set of streetlights 300. However, the separation distance 405 is generally calculated to enable adequate illumination of the surroundings.

Figure 5:
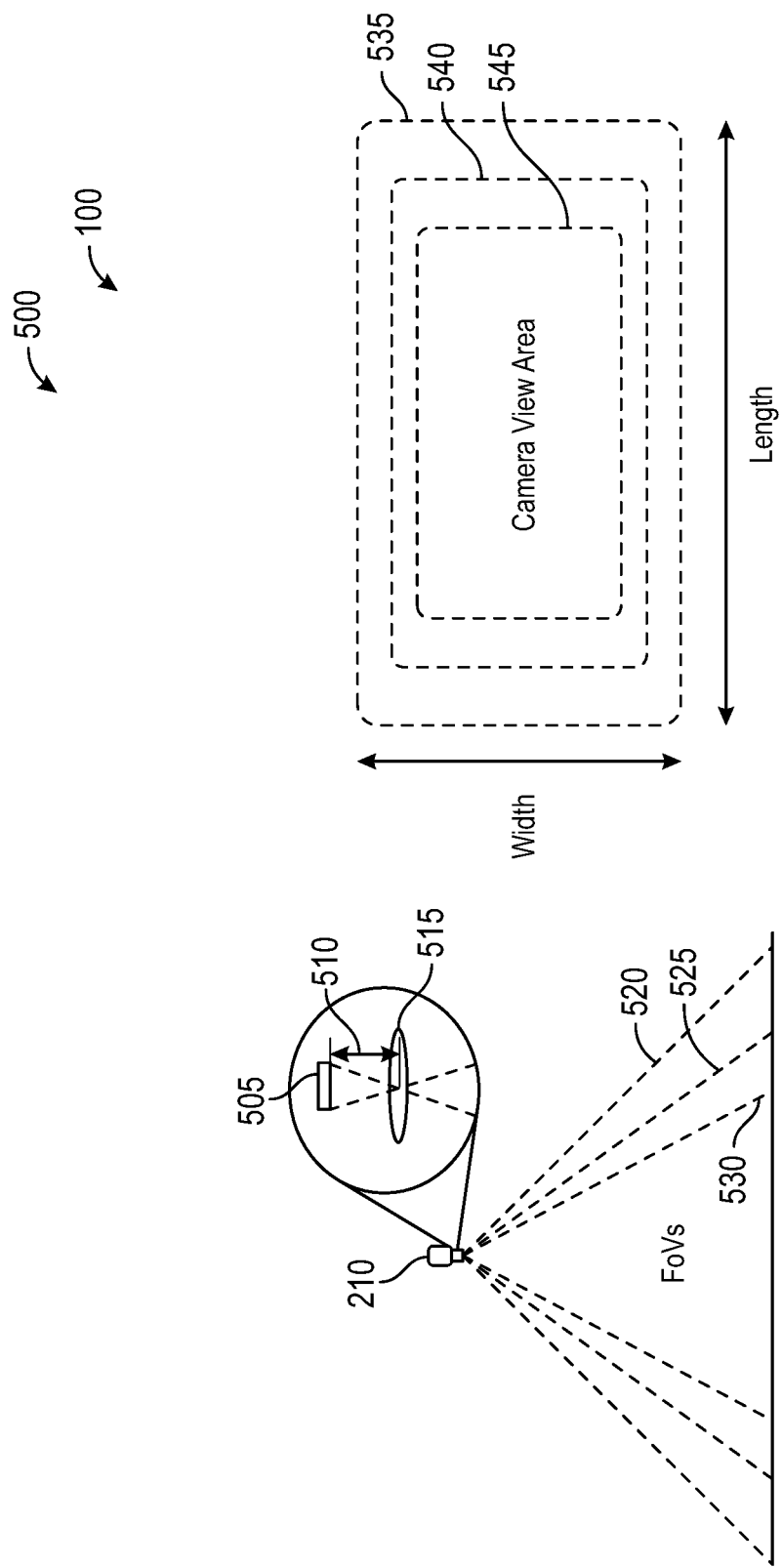
FIG. 5 is a diagrammatic view of one or more zones of the streetlight of FIG. 3.

FIG. 5 shows an example of one or more zones 500 of the camera 210. The camera 210 generally includes an image sensor 505, a focal length 510, and a lens 515. A field of view of the camera 210 is based primarily on the image sensor 505 and the focal length 510. For example, a larger image sensor 505 will result in a larger field of view and a smaller image sensor 505 will result in a smaller field of view. In another example, a longer focal length 510 results in a smaller field of view and a shorter focal length 510 results in a larger field of view. As should be appreciated, camera 210 with different fields of view may be beneficial depending on the use case. Corresponding with the field of view are the camera zones 500.

In an example, a first field of view 520 corresponds to a first zone 535, a second field of view 525 corresponds to a second zone 540, and a third field of view 530 corresponds to a third zone 545. As should be appreciated, the camera zone may also be impacted by the height 310 of the streetlight 300. For example, a larger height 310 may result in a larger zone.

Figure 6:
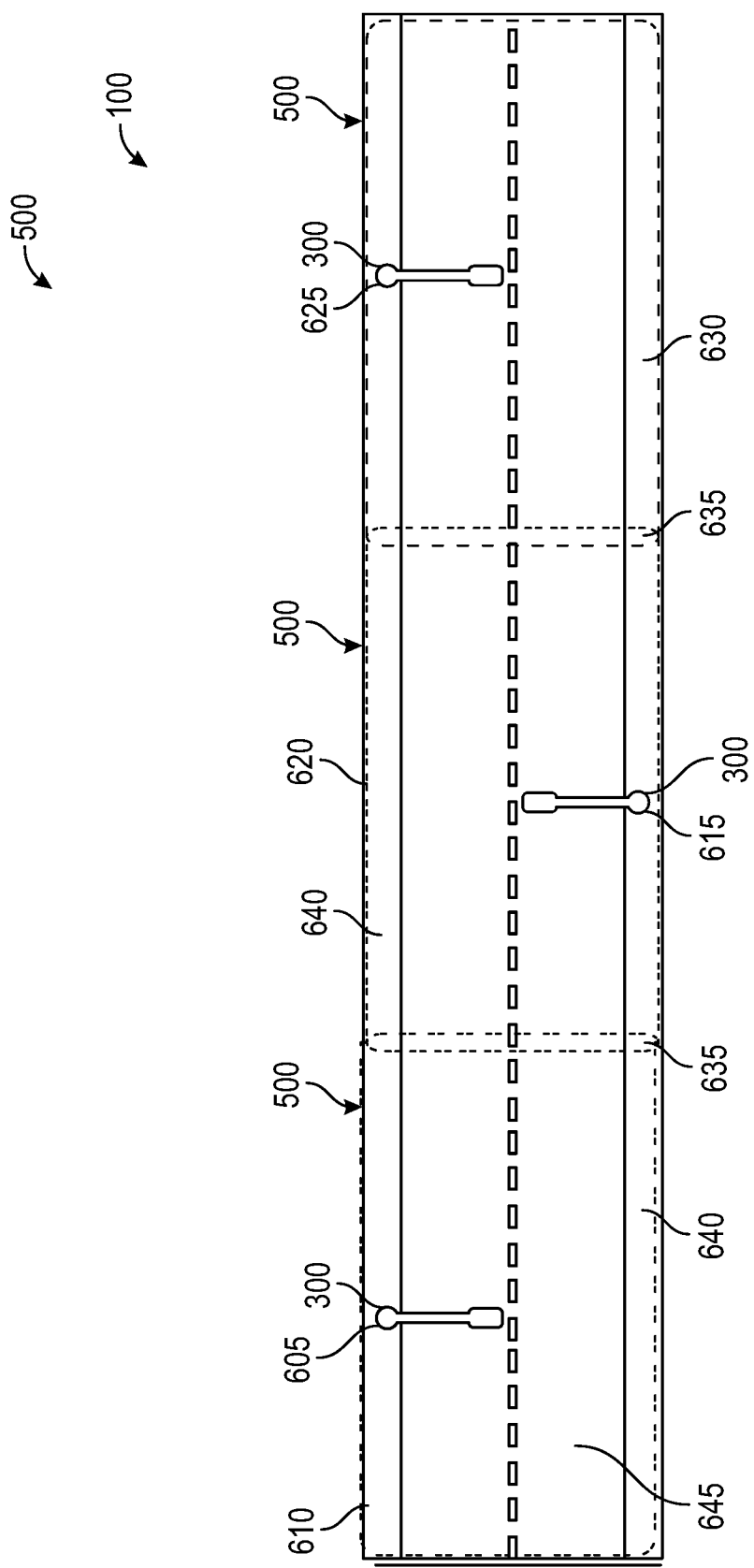
FIG. 6 is a top view of one or more zones of the situational awareness system.
Figure 7:
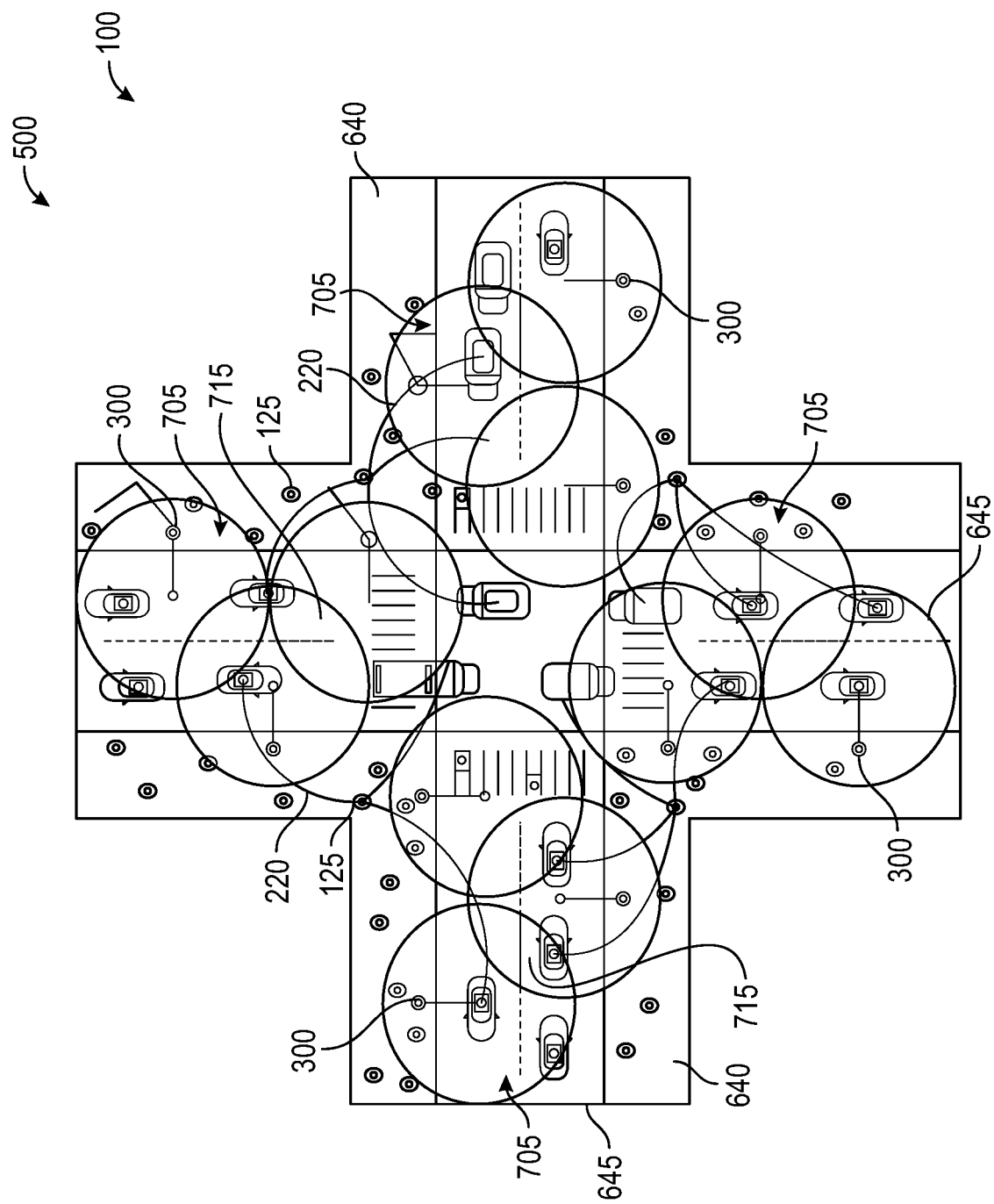
FIG. 7 is a top view of bird's eye view of the zones of the situational awareness system.

Turning to FIGS. 6 and 7, different views of the camera zones 500 of the situational awareness system 100 are shown. The situational awareness system 100 of FIG. 6 includes a first streetlight 605 with a first zone 610, a second streetlight 615 with a second zone 620, and a third streetlight 625 with a third zone 630. Generally, adjacent zones are configured to overlap slightly to create an overlapping zone 635. The overlapping zone 635 is configured to prevent object loss as a result of blind spots. The situational awareness system 100 is designed with camera zones configured to cover a sidewalk 640 and a road 645. As can be seen in FIG. 7, one or more zones 705 of the camera 210 form one or more overlapping zones 715. As mentioned previously, the overlapping zones 715 help to prevent object loss as a result of blind spots.

Figure 8:
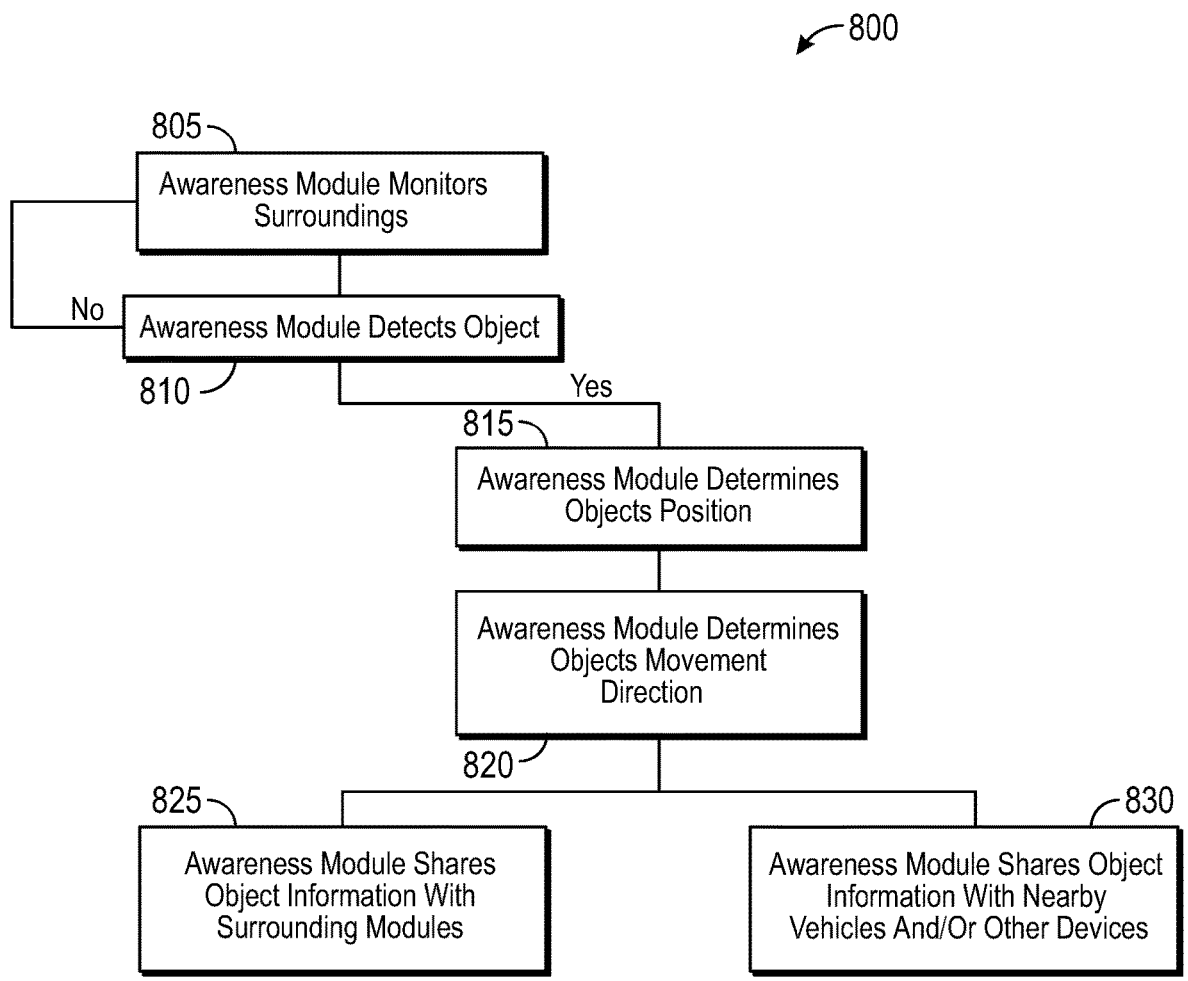
FIG. 8 is a flowchart of a situational awareness process.

FIG. 8 shows an example of a flowchart 800. At stage 805 the streetlight module 105 monitors the zones 500 surrounding the streetlight 300 containing the streetlight module 105 via the camera 210. At stage 810 the streetlight module 105 detects an object via the camera 210. If no object is detected at stage 810 the streetlight module 105 returns to monitoring the zones 500. If an object is detected at stage 810, the streetlight module 105 moves to stage 815. At stage 815 the streetlight module 105 determines the position of the detected object. At stage 820, the streetlight module 105 determines the movement direction and speed of the object. At stage 825, the streetlight module 105 shares the object detection data with one or more surrounding streetlight modules 105 via the intranet communication network 110. At stage 830, the streetlight module 105 shares the object information with one or more vehicles 120 and/or other receivers within the situational awareness system 100 via the extranet communication network 115.

Figure 9:
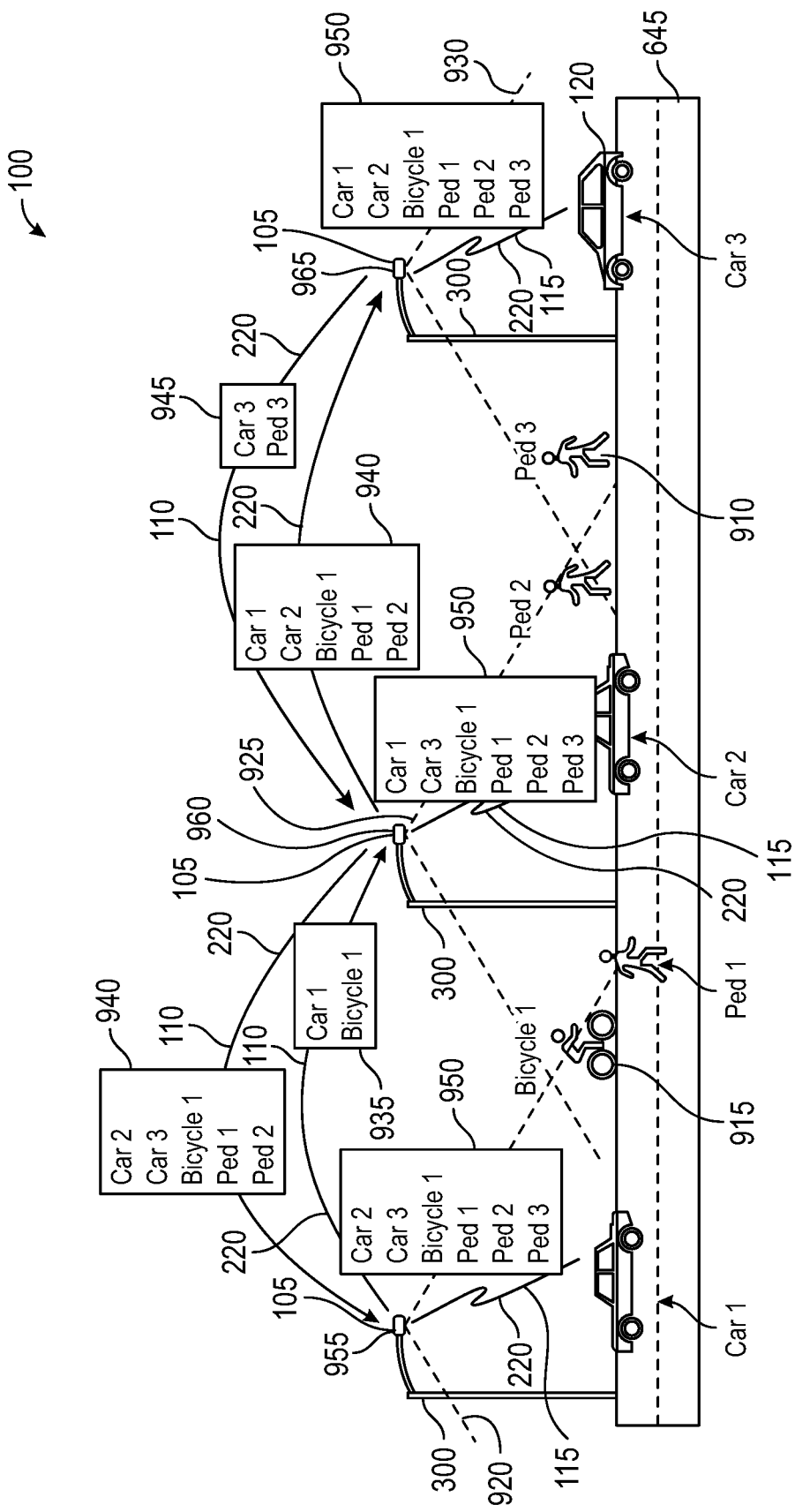
FIG. 9 is a diagrammatic view of the situational awareness system of FIG. 1.

FIG. 9 shows an example of the situational awareness system 100 in use. The situational awareness system 100 includes a first zone 920, a second zone 925, and a third zone 930 corresponding to a first awareness module 955, a second awareness module 960, and a third awareness module 965. The first awareness module 955, the second awareness module 960, and the third awareness module 965 are configured to monitor for one or more objects. The one or more objects may include a person 910, a bicycle 915, and/or a vehicle 120. In one example, the first awareness module 955 detects objects represented by a first zone data 935. The object detection data is sent by the first awareness module 955 to the second awareness module 960 via the communication network 220. Similarly, the first awareness module 955 receives object detection data from the second awareness module 960 in the form of a second zone data 940 via the communication network 220. The second awareness module 960 receives object detection data from the third awareness module 965 in the form of a third zone data 945 via the communication network 220. Similarly, the third awareness module 965 receives object detection data from the second awareness module 960 in the form of a second zone data 940 via the communication network 220. As should be appreciated, each of the streetlight modules 105 share object detection data with other streetlight modules 105 within the situational awareness system 100. The compiled object detection data is sent from the streetlight modules 105 to one or more vehicle 120. For example, the one or more vehicles 120 receive object detection data in the form of a coverage area data 950. In another embodiment, the object detection data is send from the streetlight modules 105 to one or more mobile devices and/or other devices. For example, an individual waiting to cross the road 645 receives an alert if a vehicle 120 is nearby. Similarly, an individual on a bicycle receives an alert of a vehicle 120 coming up behind them. As should be appreciated, the object detection data is able to be shares with multiple different devices based on a free and/or paid subscription model. For example, via a downloadable mobile application (App) on a mobile device.

Figure 10:
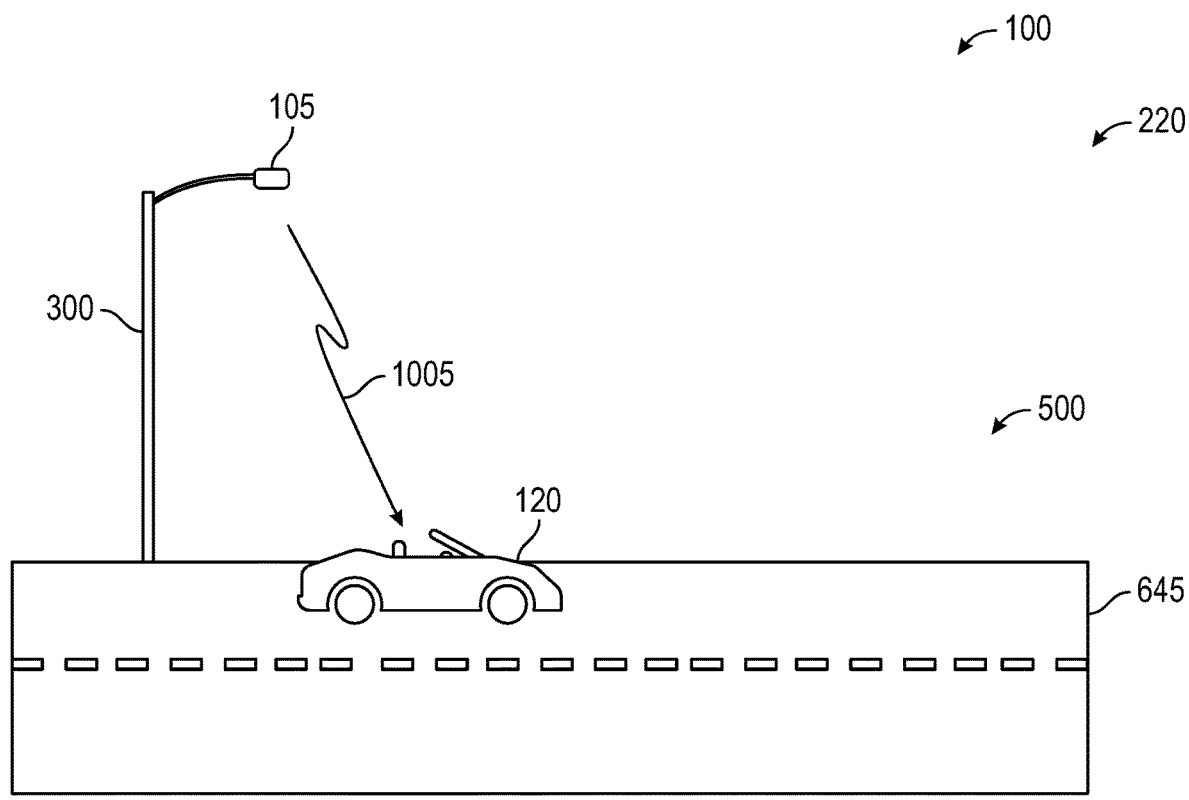
FIG. 10 is a diagrammatic view of one example of a communication network of the situational awareness system of FIG. 1.

FIG. 10 shows one example of the communication network 220 of the situational awareness system 100. The communication network 220 includes an one-way communication system 1005. In one example, the one-way communication system 1005 is a radio broadcast via a broadcast communication method. The one-way communication system 1005 sends object detection data from the streetlight module 105 to the vehicles 120. As should be appreciated, the one-way communication system 1005 is unidirectional. Meaning, the vehicle 120 does not transmit an acknowledgment and/or any other information back to the streetlight module 105. In one example, as the vehicle 120 enters a zone 500 of the situational awareness system 100, object detection data is sent from the streetlight module 105 to the vehicle 120 via the one-way communication system 1005.

Figure 11:
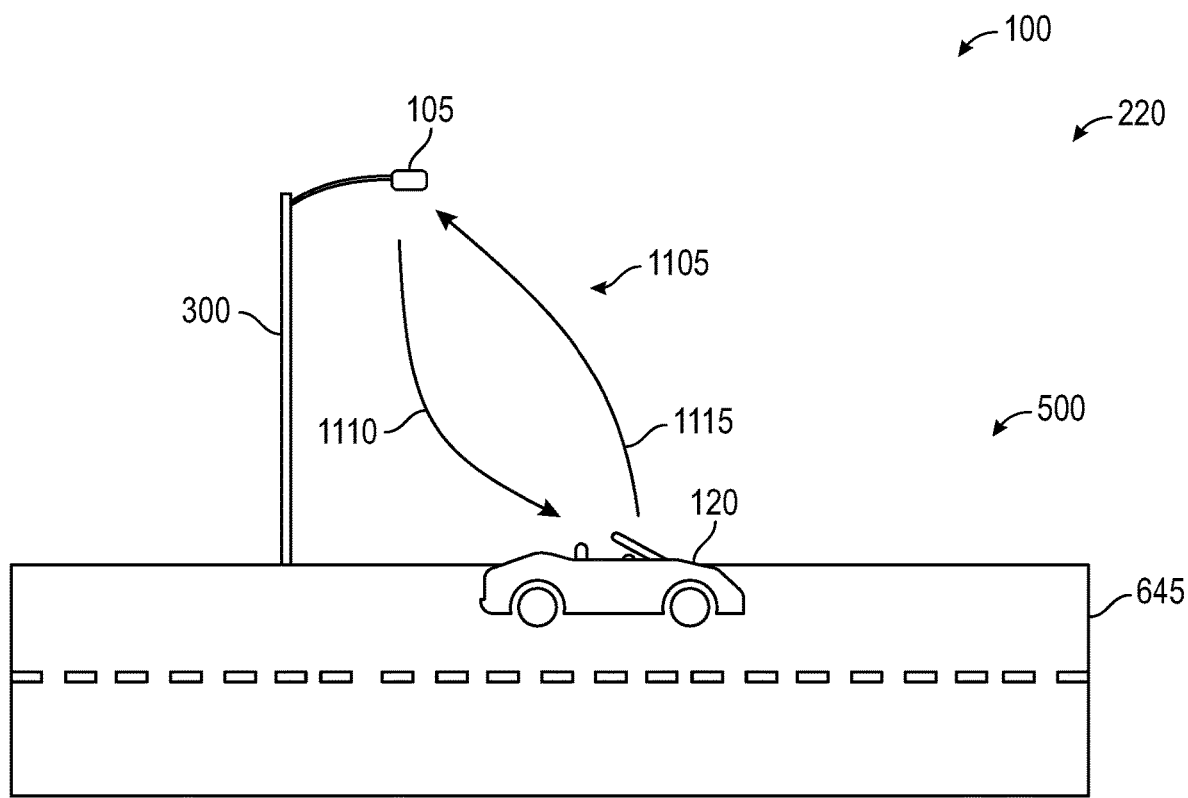
FIG. 11 is a diagrammatic view of another example of the communication network of the situational awareness system of FIG. 1.

FIG. 11 shows another example of the communication network 220 of the situational awareness system 100. The communication network 220 includes a two-way communication system 1105. In one example, the two-way communication system 1105 is a bi-directional communication method including a module to vehicle communication 1110 and a vehicle to module communication 1115. Within the two-way communication system 1105, the module to vehicle communication 1110 sends object detection data from the streetlight module 105 to the vehicle 120. However, the vehicle to module communication 1115 sends an acknowledgement and/or other notification from the vehicle 120 back to the streetlight module 105 indicating that the object detection data is received. In one example, as the vehicle 120 enters a zone 500 of the situational awareness system 100, object detection data is sent from the streetlight module 105 to the vehicle 120 via the module to vehicle communication 1110 and an acknowledgement is sent from the vehicle 120 to the streetlight module 105 via the vehicle to module communication 1115. As should be appreciated, the two-way communication system 1105 allows the situational awareness system 100 to confirm that the object detection data is received.

Figure 12:
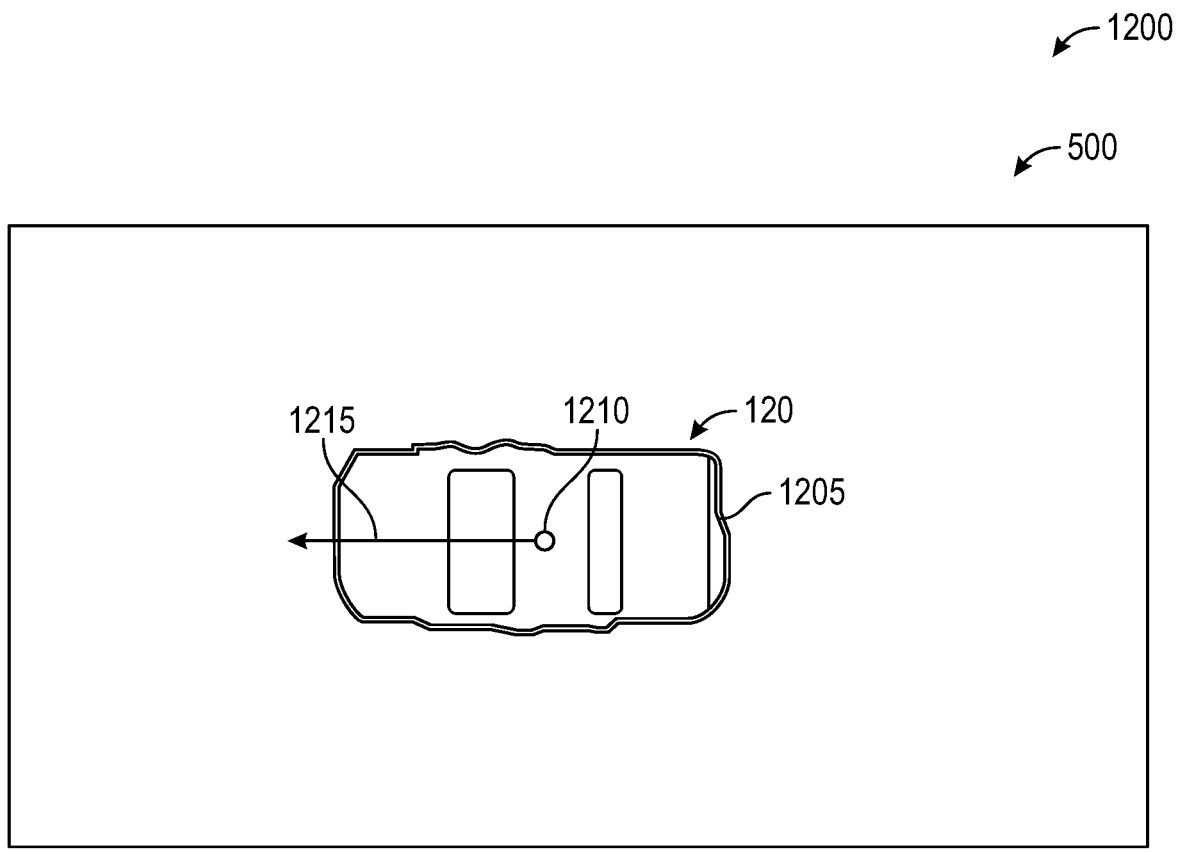
FIG. 12 is a top view of an object recognition process of the situational awareness system of FIG. 1.
Figure 13:
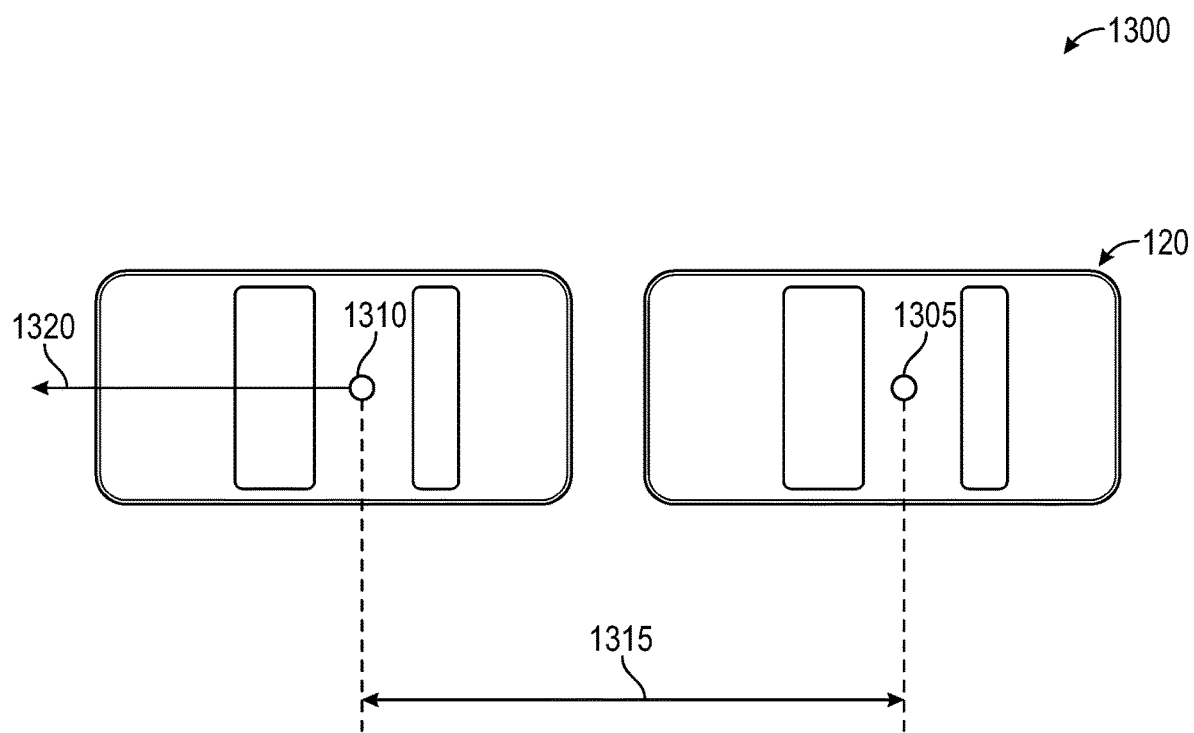
FIG. 13 is a top view of an object movement tracking process of the situational awareness system of FIG. 1.

FIGS. 12 and 13 show examples of an object recognition process 1200 and an object movement tracking process 1300 respectively. Object detection generally begins by generating an object outline 1205 of the object. Generally, object detection includes an encoder and a decoder. The encoder generally takes an image from the camera 210 as an input and breaks the image into statistical features. The statistical features are configured as an output sent to the decoder. The decoder then predicts and places the object outline 1205. Similarly, the decoder is able to generate a label for the object. For example, if vehicle 120 travels into a zone 500 of the situational awareness system 100, the camera 210 captures the image and the decoder places the object outline 1205 around and labels the object as a "vehicle."

In another embodiment, the situational awareness system 100 may utilize one or more filters to avoid tracking and/or detecting objects that do not meet a specified criterion. In one example, the situational awareness system 100 is configured to filter out small wildlife such as squirrels, birds, and/or other small rodents. The object recognition process 1200 further calculates a center point 1210 and a velocity vector 1215. The center point 1210 is used for movement calculations. For example, as best shown in FIG. 13, the velocity of an object is calculated via the equation $v=(p2-p1)/t$. In the equation, v is velocity, p2 is the second position of the object, p1 is the first position of the object, and t is time. In the example shown in FIG. 13, the vehicle 120 has a first position 1305 and a second position 1310. The second position 1310 minus the first position 1305 equals a change in position 1315. The change in position 1315 divided by the time between the first position 1305 and the second position 1310 results in a velocity vector 1320. The velocity vector 1320 is recorded by the situational awareness system 100 as object tracking and movement data.

Figure 14:
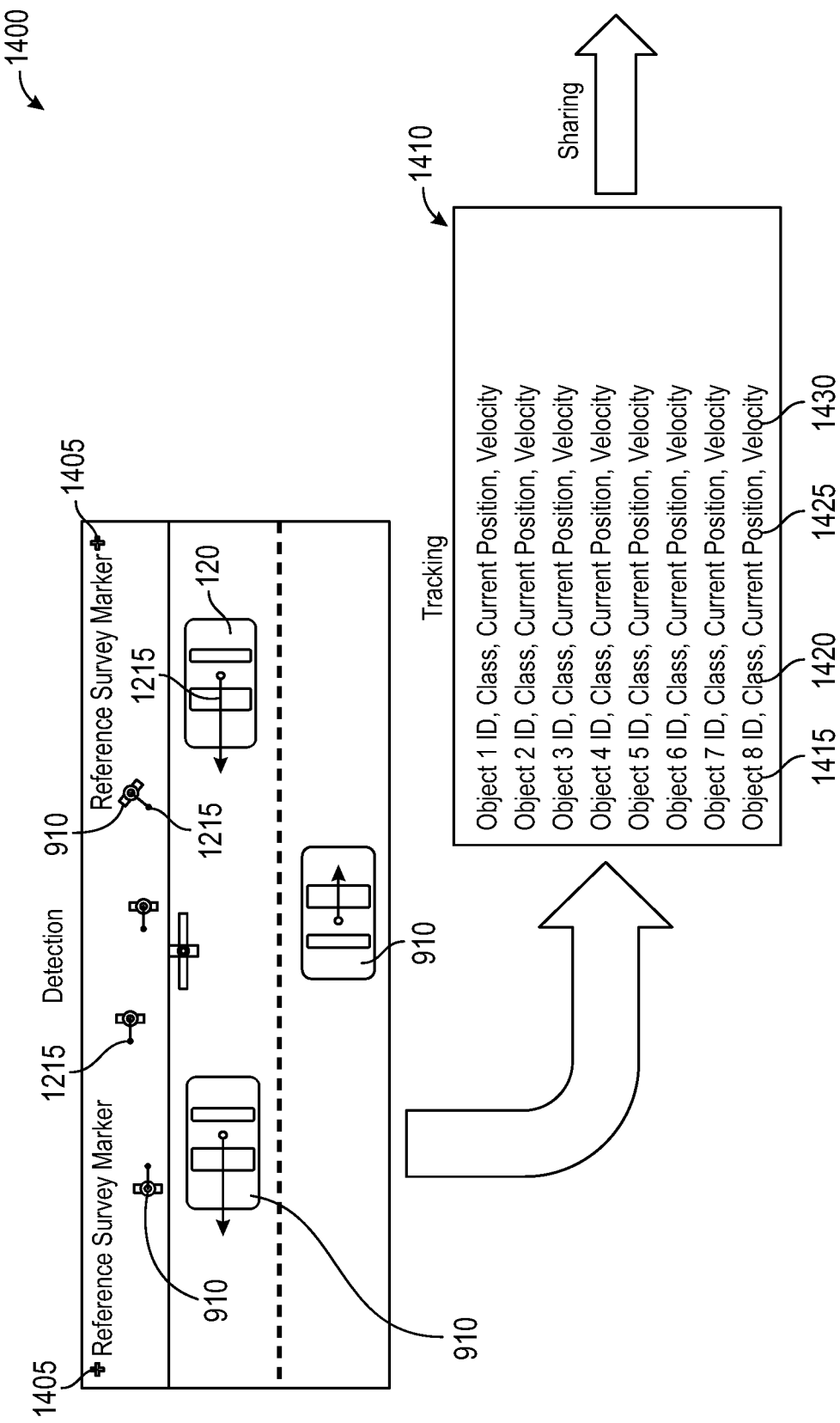
FIG. 14 is a diagrammatic view of a notification process of the situational awareness system of FIG. 1.

FIG. 14 shows an example of a notification process 1400 of the situational awareness system 100. The notification process 1400 includes a set of tracking data 1410. The tracking data 1410 includes object identifier 1415, object type 1420, object position 1425, and object velocity 1430. The object identifier 1415 is automatically assigned by the controller 205 when the object is detected. The object type 1420 is assigned to the object by the decoder as described previously. The object position 1425 is calculated based on visual information from the camera 210 and position data from the position sensor 225. The object velocity 1430 is calculated by the controller 205 as described previously. As should be appreciated, the object velocity 1430 is used to generate a localized map of the one or more zones 500. In one example, the vehicle 120 uses the localized map information to avoid hazards and/or objects. The tracking data 1410 is sent to the vehicle 120 within the situational awareness system 100 via the communication network 220. Based on the tracking data 1410, the vehicle 120 may choose how to proceed. For example, the vehicle 120 may decide to stop and/or slow down if a hazard is expected. As should be appreciated, the vehicle 120 is able to offload processing power from the vehicle 120 to the situational awareness system 100. For example, the vehicle 120 analyzes an area within a direct line of sight of the vehicle 120 for hazards and/or objects, while the situational awareness system 100 monitors an area around the vehicle 120 for hazards and/or objects outside of the line of sight of the vehicle 120. The situational awareness system 100 may then transfer the hazard and/or object detection data to the vehicle 120. In another embodiment, the situational awareness system 100 includes one or more reference markers 1405. The reference markers 1405 are configured to assist the streetlight module 105 in calibrating the position sensor 225. For example, in the event the position sensor 225 is replaced.

Figure 15:
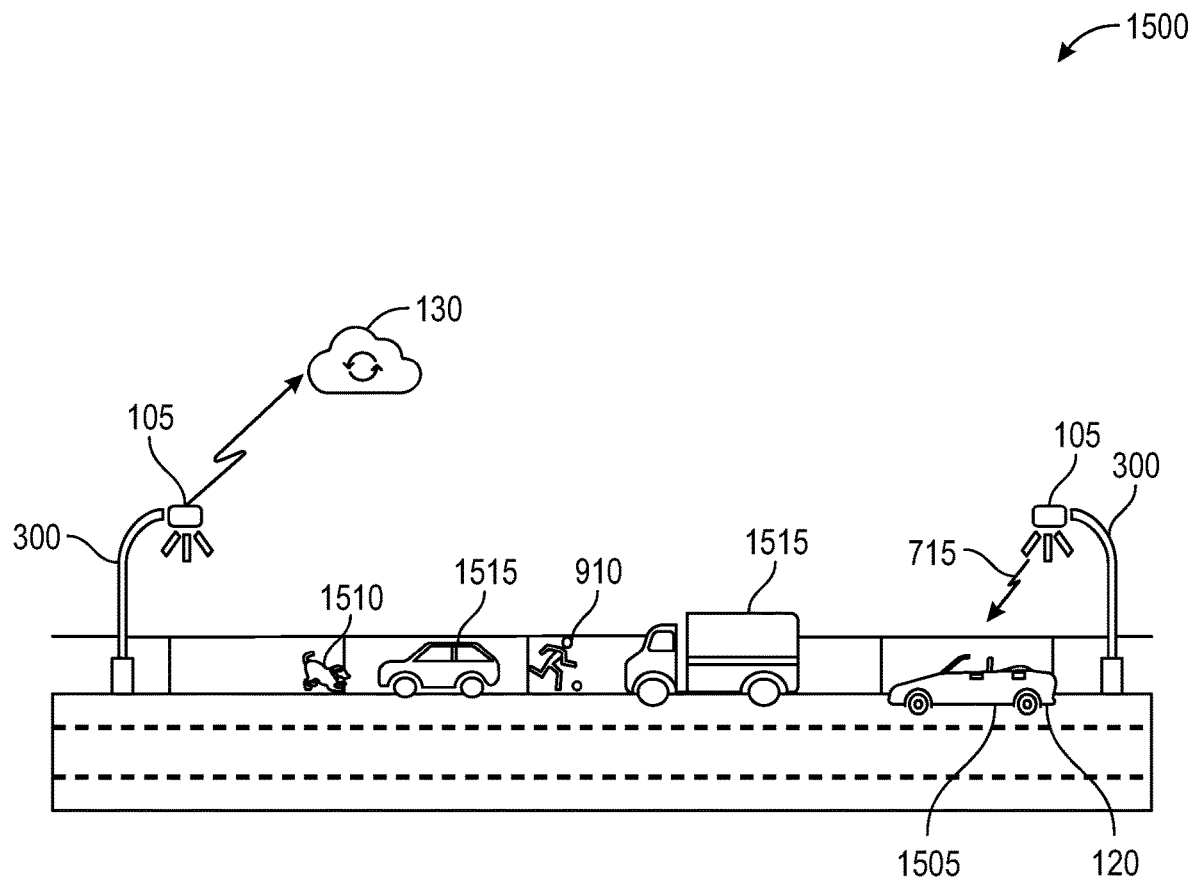
FIG. 15 is a diagrammatic view of an object detection and warning mode of the situational awareness system of FIG. 1.

FIG. 15 shows an example of an object detection and warning mode 1500 of the situational awareness system 100. As has been mentioned previously, the situational awareness system 100 is configured to share information with one or more vehicles 120. In one example, the vehicle 120 is an autonomous vehicle 1505. As should be appreciated, the situational awareness system 100 is configured to detect objects that may and/or may not be detected by the autonomous vehicle 1505 and/or the driver. For example, a child running into the street hidden by one or more parked vehicle 1515. In another example, an animal 1510 is chasing a ball into the road 645. These sudden events can lead to accidents and/or accidental death of a child and/or animal. However, the situational awareness system 100 is able to send object detection data related to the child and/or animal to the autonomous vehicle 1505. As a result, the autonomous vehicle 1505 can prepare for the hazard and act accordingly. For example, the autonomous vehicle 1505 may slow down and/or use extreme caution when moving forward.

Figure 16:
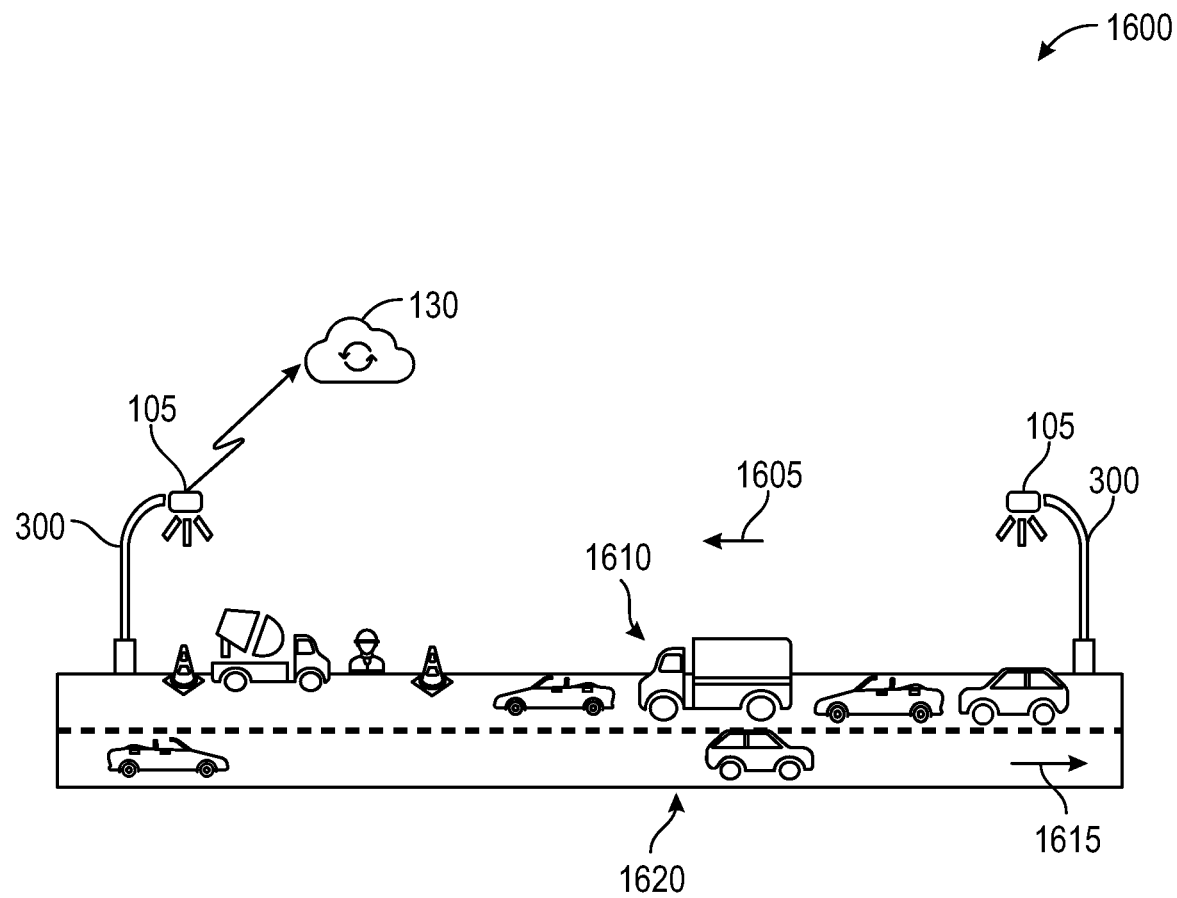
FIG. 16 is a diagrammatic view of a traffic monitoring mode of the situational awareness system of FIG. 1.

FIG. 16 shows an example of a traffic monitoring mode 1600 of the situational awareness system 100. The traffic monitoring mode 1600 is configured to monitor traffic flow on the road 645. For example, the situational awareness system 100 may detect that traffic in a first direction 1605 is jammed traffic 1610 and that traffic in a second direction 1615 is free flowing traffic 1620. The situational awareness system 100 detects traffic flow via one or more streetlight modules 105. The streetlight modules 105 detect the number of vehicles 120 within a predetermined zone. For example, free flow conditions are defined by less than 12 vehicles per mile per lane of road, stable conditions are defined as 12-30 vehicles per mile per lane of road, unstable conditions are defined as 30-67 vehicles per mile per lane of road, breakdown conditions are defined as 67-185 vehicles per mile per lane of road, and jam conditions are referred to as over 185 vehicles per mile per lane of road. As should be appreciated, the situational awareness system 100 may share traffic information in real-time with one or more vehicles 120 and/or other devices. The traffic information may be used to automatically update route planning and/or navigation systems. In another embodiment, a user may opt in and/or pay a subscription fee to access the traffic information via a mobile device, vehicle infotainment system, and/or other device.

Figure 17:
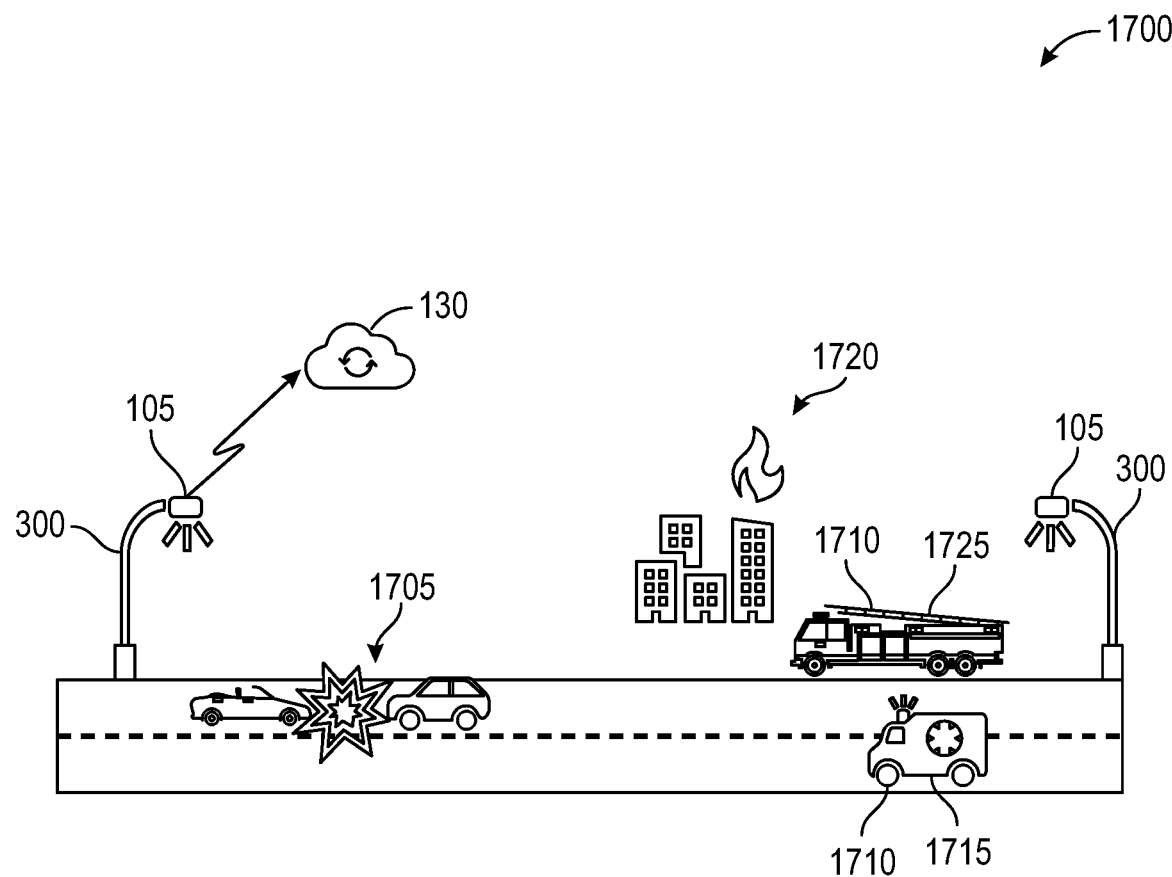
FIG. 17 is a diagrammatic view of a hazard detection mode of the situational awareness system of FIG. 1.

FIG. 17 shows an example of a hazard detection mode 1700 of the situational awareness system 100. The hazard detection mode 1700 is configured to detect a road hazard 1705 via the streetlight module 105. The situational awareness system 100 may detect the road hazard 1705 by noting the lack of movement of one or more vehicle 120. In another example, the situational awareness system 100 may detect a fire 1720. The situational awareness system 100 may detect the fire 1720 by viewing one or more flames and/or a large amount of smoke. As should be appreciated, the situational awareness system 100 is generally configured to monitor for objects on and/or nearby the sidewalk 640 and/or road 645. However, in another embodiment, it is envisioned that the situational awareness system 100 is able to detect objects that are further from the sidewalk 640 and/or road 645. In the event of a hazard, the situational awareness system 100 is configured to send an alert to emergency services 1710. For example, the situational awareness system 100 may contact an ambulance 1715 in the event of a road hazard 1705. In another example, the situational awareness system 100 may contact a fire truck 1725 in the event of a fire 1720. As should be appreciated, the situational awareness system 100 is configured to detect the type of hazard and automatically contact the proper emergency services 1710 depending on the hazard type. In another example, the situational awareness system 100 may transmit a warning to one or more vehicles 120 to avoid the area. In another embodiment, the situational awareness system 100 may transmit a warning to one or more mobile devices and/or other devices. In one example, a user may opt in to a paid and/or free service, which delivers information from the situational awareness system 100 to a mobile device and/or other device.

Figure 18:
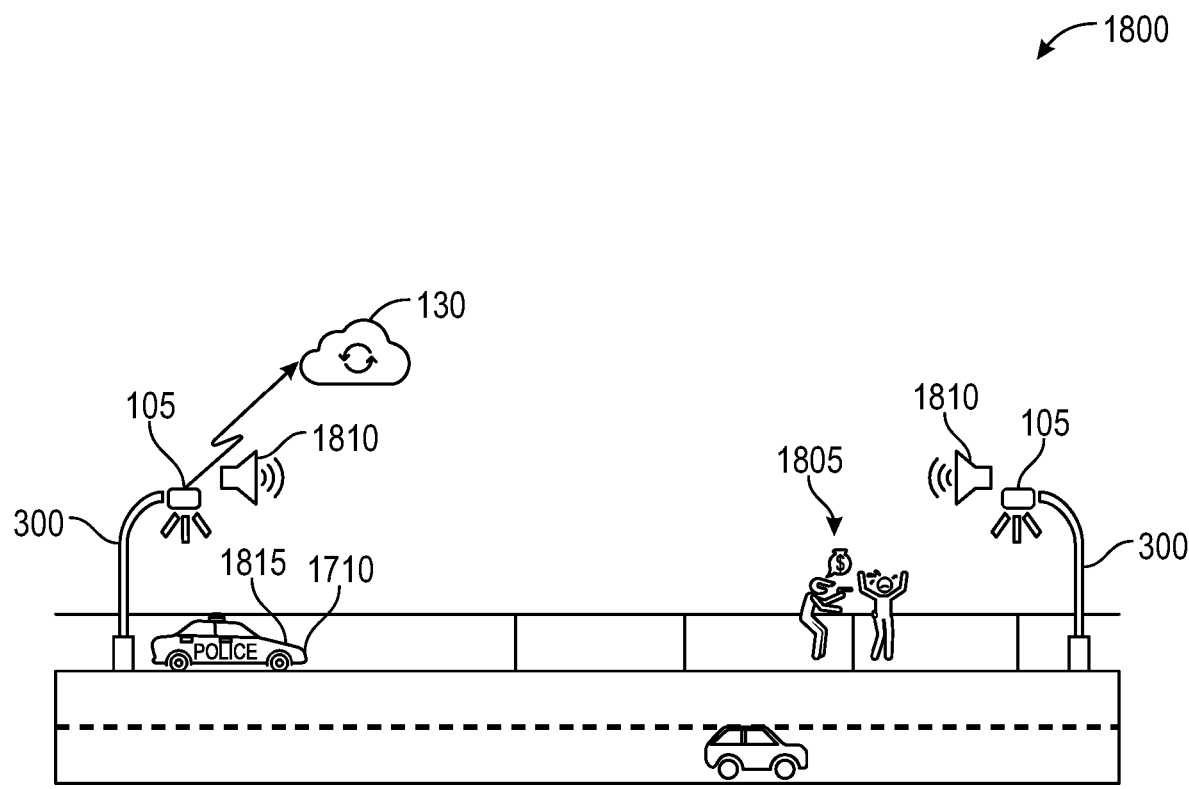
FIG. 18 is a diagrammatic view of a safety monitoring mode of the situational awareness system of FIG. 1.

FIG. 18 shows an example of a safety monitoring mode 1800 of the situational awareness system 100. The safety monitoring mode 1800 is configured to deter bad actors and/or act as a tracking system for monitoring the safety of one or more individuals. For example, the situational awareness system 100 monitors an individual as they move through a zone of the situational awareness system 100. For example, the user may enable tracking via a mobile phone application (app) when monitoring is desired. In another example, the situational awareness system 100 simply monitors all individuals within a predetermined coverage area. If the situational awareness system 100 detects any event that warrants intervention, for example, a burglary and/or a similar event, the situational awareness system 100 sounds an alert 1810 and/or flash a light. Additionally, the situational awareness system 100 may automatically contact authorities in the event of a triggering event 1805. For example, the situational awareness system 100 may contact the police 1815. In yet another embodiment, after the triggering event 1805, the situational awareness system 100 may track the suspect to assist the police 1815. As should be appreciated, the situational awareness system 100 uses object detection and tracking as described earlier to track the suspect through the situational awareness system 100. For example, the suspect ID and movement direction may be transferred throughout the situational awareness system 100 via the intranet communication network 110. In one embodiment, a user pays a subscription fee to utilize the tracking functions. In another example, the user downloads a free and/or paid mobile application (App) on a mobile device to access the tracking functions.

Figure 19:
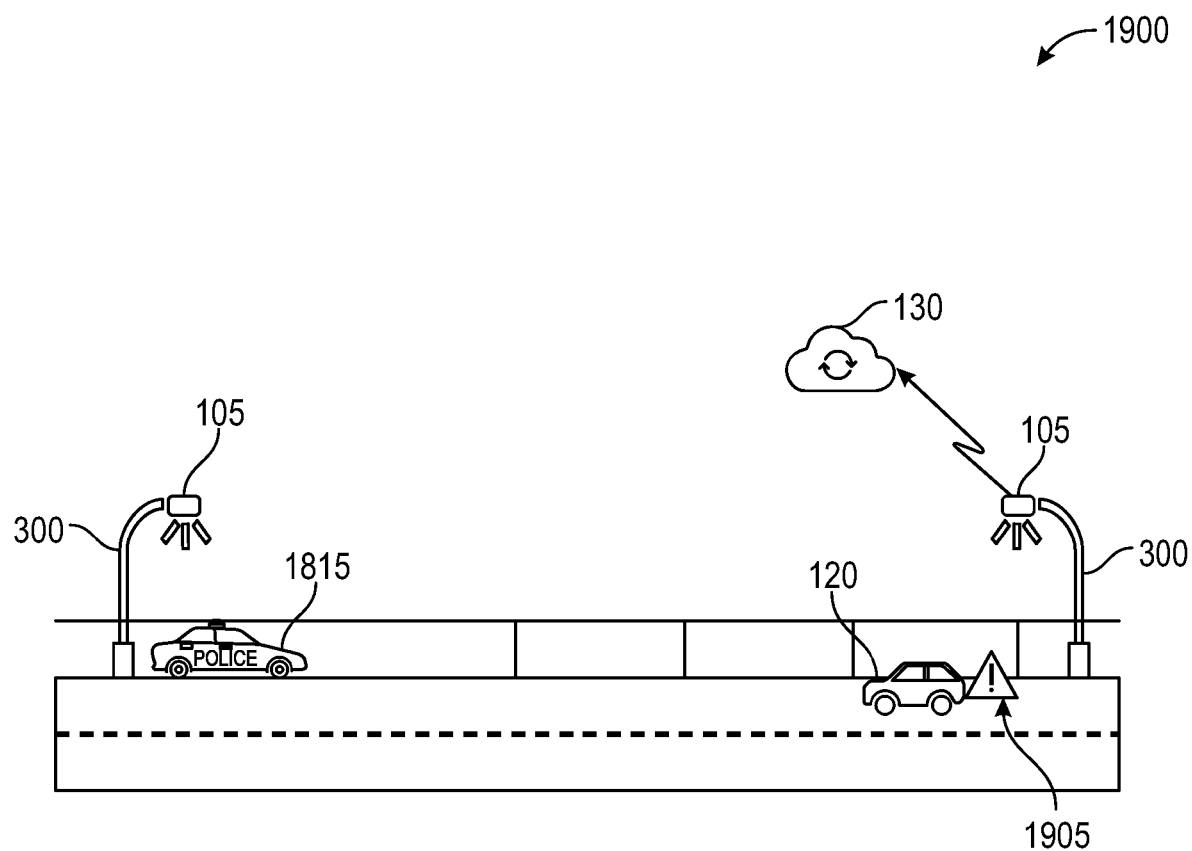
FIG. 19 is a diagrammatic view of a license plate tracking mode of the situational awareness system of FIG. 1.

FIG. 19 shows an example of a license plate tracking mode 1900 of the situational awareness system 100. The license plate tracking mode 1900 is configured to monitor a license plate 1905 of a situational awareness system 100. In one example, the license plate tracking mode 1900 is an amber alert mode configured to compare the license plate 1905 to an amber alert database. If the license plate 1905 corresponds to a license plate 1905 within the database the situational awareness system 100 may begin to track the vehicle 120. Simultaneously, the situational awareness system 100 may contact the police 1815. In one example, as a vehicle 120 drives through a zone 500 of the situational awareness system 100, the streetlight module 105 reads the license plate 1905. After reading the license plate 1905, the streetlight module 105 compares the license plate 1905 to the database. If the license plate 1905 matches the database, the situational awareness system 100 generates an alert to the police 1815 and continues to track the movements of the vehicle 120. As should be appreciated, the license plate tracking mode 1900 may be used for tracking and/or contacting the police 1815 in other scenarios besides amber alert scenarios. For example, hit and run accidents, outstanding warrants for arrest, and/or other similar events.

Figure 20:
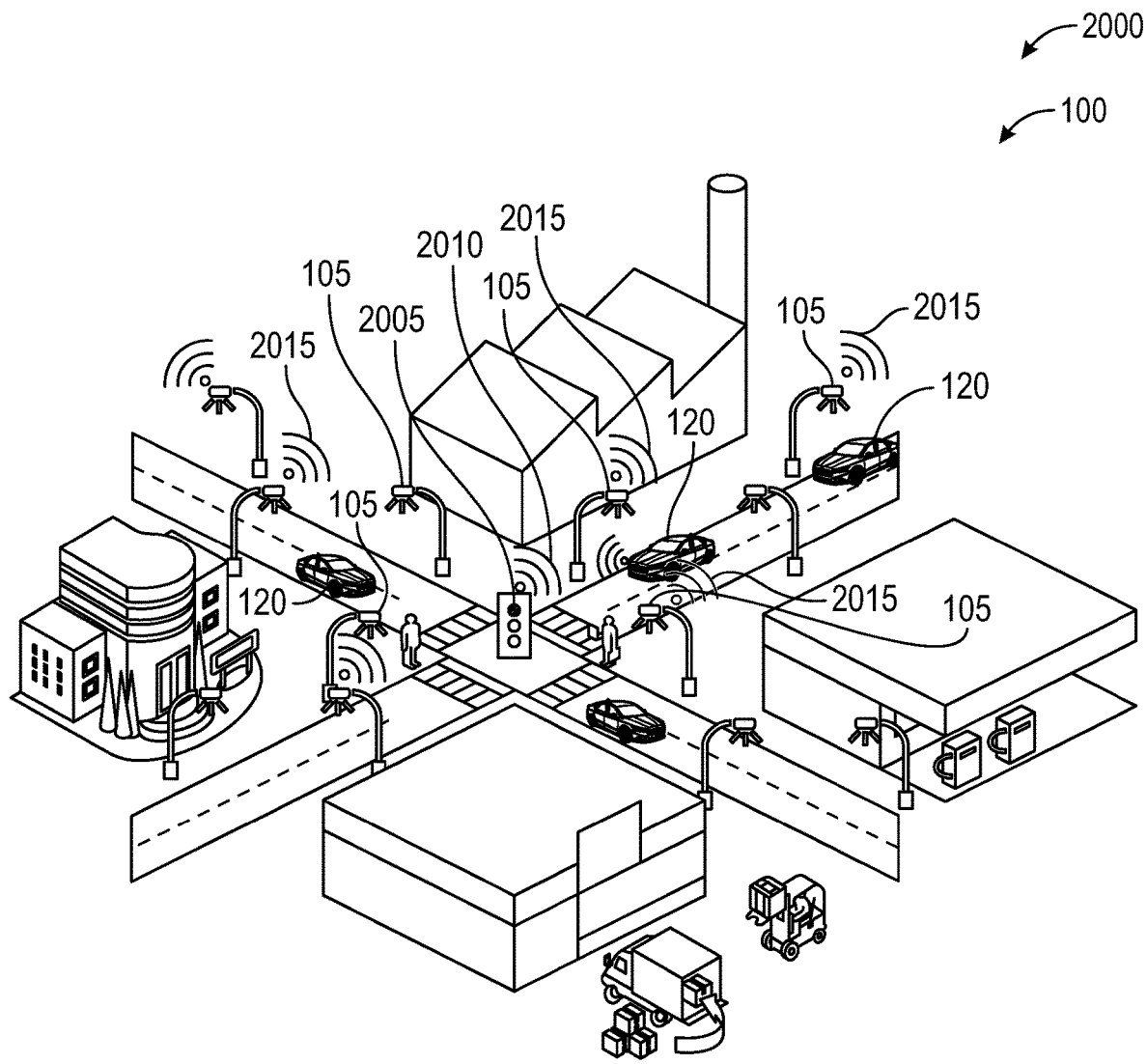
FIG. 20 is a perspective view of a traffic management mode of the situational awareness system of FIG. 1.

FIG. 20 shows an example of a traffic management mode 2000 of the situational awareness system 100. The traffic management mode 2000 includes the situational awareness system 100 networked with one or more traffic lights 2005 to enable the situational awareness system 100 to assist in optimizing traffic flow. For example, the situational awareness system 100 may detect the congestion in an intersection as discussed previously. Based on the congestion level, the situational awareness system 100 can recommend actions to the traffic light 2005 via a street status broadcast 2015. For example, the situational awareness system 100 can alert the traffic light 2005 to change the light color due to a large number of stopped vehicles 120.

In another example, the situational awareness system 100 is configured to monitor a status of traffic light 2005 via a light status broadcast 2010. The situational awareness system 100 may then transmit the light status of the traffic light 2005 to one or more vehicles 120. As should be appreciated, the vehicles 120 may react to the status indicator from the situational awareness system 100 to avoid accidents. In another embodiment, the situational awareness system 100 is configured to alert the traffic light 2005 if a vehicle 120 is driving erratically. For example, a vehicle 120 is approaching the intersection at a high rate of speed. The situational awareness system 100 may alert the traffic light 2005 to change all surrounding traffic lights 2005 to red in order to stop traffic. Similarly, the situational awareness system 100 may alert the traffic lights 2005 to change all lights to red for a funeral procession and/or other emergency service. As should be appreciated, the situational awareness system 100 may also log and/or store congestion information to the cloud storage device 130 for use in traffic planning.

GLOSSARY OF TERMS

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"About" with reference to numerical values generally refers to plus or minus 10% of the stated value. For example if the stated value is 4.375, then use of the term "about 4.375" generally means a range between 3.9375 and 4.8125.

"Aftermarket Product" generally refers to one or more parts and/or accessories used in repair and/or enhancement of a product already made and sold by an Original Equipment Manufacturer (OEM). For example, aftermarket products can include spare parts, accessories, and/or components for motor vehicles.

"And/Or" generally refers to a grammatical conjunction indicating that one or more of the cases it connects may occur. For instance, it can indicate that either or both of two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Communication Link" or "Communication Channel" generally refers to a connection between two or more communicating entities and may or may not include a communications channel between the communicating entities. The communication between the communicating entities may occur by any suitable means. For example, the connection may be implemented as an actual physical link, an electrical link, an electromagnetic link, a logical link, or any other suitable linkage facilitating communication. In the case of an actual physical link, communication may occur by multiple components in the communication link configured to respond to one another by physical movement of one element in relation to another. In the case of an electrical link, the communication link may be composed of multiple electrical conductors electrically connected to form the communication link. In the case of an electromagnetic link, elements of the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum. In the case of a logical link, the communication links may be a conceptual linkage between the sender and recipient such as a transmission station in the receiving station. Logical link may include any combination of physical, electrical, electromagnetic, or other types of communication links.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. A computer may include one or more physical processors or other computing devices or circuitry, and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of a disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus, a controller may include one or more physical processors or other computing devices or circuitry, and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour. Data may be organized and represented in a structured format. Examples include a tabular representation using rows and columns, a tree representation with a set of nodes considered to have a parent-children relationship, or a graph representation as a set of connected nodes to name a few. The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Electrical Connection" means here a connection between two objects that allows a flow of electric current and/or electric signals.

"Emitter" means the terminal of a bipolar junction transistor out of which a switched current leaves the transistor when the transistor is forward biased.

"Guidance, Navigation and Control System" (GNC) generally refers to systems to control the movement of vehicles, especially, automobiles, ships, aircraft, and spacecraft. In many cases these functions can be performed by trained humans. However, because of the speed of, for example, a rocket's dynamics, human reaction time is too slow to control this movement. Therefore, systems—now almost exclusively digital electronic—are used for such control. Even in cases where humans can perform these functions, it is often the case that GNC systems provide benefits such as alleviating operator work load, smoothing turbulence, fuel savings, etc. In addition, sophisticated applications of GNC enable automatic or remote control.

"Housing" generally refers to a component that covers, protects, and/or supports another thing. A housing can have a unitary construction or made of multiple components. The housing can be made from the same material or a combination of different materials. The housing can include a protective cover designed to contain and/or support one or more mechanical components. Some non-limiting examples of a housing include a case, enclosure, covering, body, and shell.

"Lamp" generally refers to an electrical device configured to produce light using electrical power. The generated light may be in the visible range, ultraviolet, infrared, or other light. Example illumination technologies that may be employed in a lamp include, but are not limited to, incandescent, halogen, LED, fluorescent, carbon arc, xenon arc, metal-hallide, mercury-vapor, sulfer, neon, sodium-vapor, or others.

"Light Emitting Diode" or "LED" generally refers to a semiconductor diode, made from certain materials, in which light is emitted in response to application of an electrical current. A variety of materials in the LED can produce a range of colors. The color of the light (corresponding to the energy of the photons) is determined by the energy required for electrons to cross the band gap of the semiconductor. Typically, but not always, white light is obtained by using multiple semiconductors or a layer of light-emitting phosphor on the semiconductor device. The LED can come in the form of a variety of colors, shapes, sizes and designs, including with or without heat sinking, lenses, or reflectors, built into the package.

"LED Lamp" generally refers to an electrical device that uses Light Emitting Diodes (LEDs) to produce light using electrical power. A lamp may include a single LED, or multiple LEDs.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other. Examples of wired network connections may include Digital Subscriber Lines (DSL), coaxial cable lines, or optical fiber lines. The wireless connections may include BLUETOOTH®, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11(b), 802.11(g), or 802.11(n) to name a few). Wireless links may also include or use any cellular network standards used to communicate among mobile devices including 1G, 2G, 3G, 4G, or 5G. The network standards may qualify as 1G, 2G, etc. by fulfilling a specification or standards such as the specifications maintained by the International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced. Cellular network standards may use various channel access methods such as FDMA, TDMA, CDMA, or SDMA. Different types of data may be transmitted via different links and standards, or the same types of data may be transmitted via different links and standards. The geographical scope of the network may vary widely. Examples include a Body Area Network (BAN), a Personal Area Network (PAN), a Local-Area Network (LAN), a Metropolitan Area Network (MAN), a Wide Area Network (WAN), or the Internet. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

"Optionally" means discretionary; not required; possible, but not compulsory; left to personal choice.

"Original Equipment Manufacturer" or "OEM" generally refers to an organization that makes finished devices from component parts bought from other organizations that are usually sold under their own brand in a consumer or commercial market.

"Power Converter" generally refers to a device that changes one form of energy to another form. In electrical systems, power converters change electric energy from one form to another, such as converting alternating current (AC) to direct current (DC) (or vice-versa) and/or changing electrical voltage, current, frequency, and/or phase of the electricity. For DC to DC conversion, the power converter can include voltage regulators and/or linear regulators. The power converter can include an inverter to change DC to AC, and the power converter can include a rectifier to change AC to DC. For AC to AC conversion, the power converter can include a transformer, autotransformer, variable-frequency transformer, voltage converter, voltage regulator, and/or cycloconverter. These of course are just a few non-limiting examples. Power converters can also change other forms of energy, such as mechanical and/or chemical energy, to name just a few. For instance, the power converter can include a hydraulic pump that converts electrical energy to mechanical energy when the energy storage system is in the form of a hydraulic accumulator.

"Remote" generally refers to any physical, logical, or other separation between two things. The separation may be relatively large, such as thousands or millions of miles or kilometers, or small such as nanometers or millionths of an inch. Two things "remote" from one another may also be logically or physically coupled or connected together.

"Road" generally refers to a mostly public way for the passage of vehicles, people, and/or animals. In other words, a road can include a linear way for the conveyance of traffic that typically has an improved surface for use by vehicles (motorized and non-motorized), pedestrians, and/or animals. By way of non-limiting examples, the road can include streets, parkways, avenues, freeways, tollways, thoroughfares, and highways, to name just a few.

"Satellite Navigation" generally refers to a system that uses satellites to provide geo-spatial positioning data. In one example, the system may include a receiver that interacts with satellites using electromagnetic radiation. The timing of the transmission of the signal from the receiver to the satellites allows calculation of the position of the receiver using triangulation. Some of examples of satellite navigation systems include global positioning systems such as GPS and GLONASS as well as global positioning systems under development such as Galileo. A satellite navigation system may also be a regional positioning system such as BeiDou, NAVIC, and QZSS.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Server" generally refers to a computer or group of computers that provide(s) data to other computers. It may serve data to systems on a local area network (LAN) or a wide area network (WAN) over the Internet.

"Streetlight" or "Streetlamp" generally refers to an illumination device configured to illuminate a road, street, highway, or other paths. Typically, but not always, the streetlight includes a raised source of light, such as one mounted on a tall pole, that is located along the edge of a road or other path.

"Transceiver" generally refers to a device that includes both a transmitter and a receiver that share common circuitry and/or a single housing. Transceivers are typically, but not always, designed to transmit and receive electronic signals, such as analog and/or digital radio signals.

"Vehicle" generally refers to a machine that transports people and/or cargo. Common vehicle types can include land-based vehicles, amphibious vehicles, watercraft, aircraft, and space craft. By way of non-limiting examples, land-based vehicles can include wagons, carts, scooters, bicycles, motorcycles, automobiles, buses, trucks, semitrailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

"Vision System" generally refers to one or more devices that collect data and form one or more images by a computer and/or other electronics to determine an appropriate position and/or to "see" an object. The vision system typically, but not always, includes an imaging-system that incorporates hardware and software to generally emulate functions of an eye, such as for automatic inspection and robotic guidance. In some cases, the vision system can employ one or more video cameras, Analog-to-Digital Conversion (ADC), and Digital Signal Processing (DSP) systems. By way of a non-limiting example, the vision system can include a charge-coupled device for inputting one or more images that are passed onto a processor for image processing. A vision system is generally not limited to just the visible spectrum. Some vision systems image the environment at infrared (IR), visible, ultraviolet (UV), and/or X-ray wavelengths. In some cases, vision systems can interpret three-dimensional surfaces, such as through binocular cameras.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | situational awareness system |
| 105 | streetlight module |
| 110 | intranet communication network |
| 115 | extranet communication network |
| 120 | vehicle |
| 125 | base station |
| 130 | cloud storage device |
| 202 | power converter |
| 205 | controller |
| 210 | camera |
| 215 | lamp array |
| 220 | communication network |
| 225 | position sensor |
| 230 | global navigation satellite system |
| 235 | dual communication network |
| 240 | thermal camera |
| 245 | object detection sensors |
| 250 | speaker |
| 300 | streetlight |
| 305 | post |
| 310 | height |
| 315 | arm |
| 320 | housing |
| 405 | separation distance |
| 500 | zones |
| 505 | image sensor |
| 510 | focal length |
| 515 | lens |
| 520 | first field of view |
| 525 | second field of view |
| 530 | third field of view |
| 535 | first zone |
| 540 | second zone |

-continued

| Reference Numbers | |
|---|---|
| 545 | third zone |
| 600 | street view |
| 605 | first streetlight |
| 610 | first zone |
| 615 | second streetlight |
| 620 | second zone |
| 625 | third streetlight |
| 630 | third zone |
| 635 | overlapping zone |
| 640 | sidewalk |
| 645 | road |
| 700 | birds eye view |
| 705 | zones |
| 715 | overlapping zones |
| 800 | flowchart |
| 805 | stage |
| 810 | stage |
| 815 | stage |
| 820 | stage |
| 825 | stage |
| 830 | stage |
| 910 | person |
| 915 | bicycle |
| 920 | first zone |
| 925 | second zone |
| 930 | third zone |
| 935 | first zone data |
| 940 | second zone data |
| 945 | third zone data |
| 950 | coverage area data |
| 955 | first awareness module |
| 960 | second awareness module |
| 965 | third awareness module |
| 1005 | one-way communication system |
| 1105 | two-way communication system |
| 1110 | module to vehicle communication |
| 1115 | vehicle to module communication |
| 1200 | object recognition process |
| 1205 | object outline |
| 1210 | center point |
| 1215 | velocity vector |
| 1300 | object movement tracking process |
| 1305 | first position |
| 1310 | second position |
| 1315 | change in position |
| 1320 | velocity vector |
| 1400 | notification process |
| 1405 | reference markers |
| 1410 | tracking data |
| 1415 | object identifier |
| 1420 | object type |
| 1425 | object position |
| 1430 | object velocity |
| 1500 | object detection and warning mode |
| 1505 | autonomous vehicle |
| 1510 | animal |
| 1515 | parked vehicle |
| 1600 | traffic monitoring mode |
| 1605 | first direction |
| 1610 | jammed traffic |
| 1615 | second direction |
| 1620 | free flowing traffic |
| 1700 | hazard detection mode |
| 1705 | road hazard |
| 1710 | emergency services |
| 1715 | ambulance |
| 1720 | fire |
| 1725 | fire truck |
| 1800 | safety monitoring mode |
| 1805 | triggering event |
| 1810 | alert |
| 1815 | police |
| 1900 | license plate tracking mode |
| 1905 | license plate |
| 2000 | traffic management mode |
| 2005 | traffic light |
| 2010 | light status broadcast |
| 2015 | street status broadcast |

What is claimed is:

1. A streetlight situational awareness system (SSAS), comprising:
two or more streetlight modules configured to visually monitor corresponding zones along a road;
wherein the streetlight modules are each integrated into a streetlight configured to illuminate the road;
wherein the streetlight modules each include a camera configured to visually monitor the zones;
wherein the streetlight modules are configured to track objects when moving between the zones;
wherein the streetlight modules each include a controller configured to determine tracking data for the objects;
wherein the tracking data includes object type, object position, and object velocity;
wherein the streetlight modules each include a radio transceiver;
a vehicle travelling along the road;
wherein the radio transceiver is configured to transmit the tracking data to the vehicle;
wherein processing power of the vehicle for determining the tracking data is offloaded to the streetlight modules;
wherein the tracking data is used to generate a localized map of the zones; and
wherein the vehicle is configured to react to avoid hazards detected in the tracking data received from the streetlight modules.

2. The system of claim 1, wherein the camera is configured to visually monitor the zones from above the road.

3. The system of claim 1, wherein the camera has a field of view defining a boundary of the zone for the streetlight module.

4. The system of claim 1, further comprising:
a dual communication network configured to communicate the tracking data from the streetlight modules.

5. The system of claim 1, further comprising:
an intranet communication network configured to communicate the tracking data between the streetlight modules.

6. The system of claim 1, further comprising:
an extranet communication network configured facilitate communications between the streetlight modules and the vehicle.

7. The system of claim 6, wherein the extranet communication network is configured to facilitate one-way broadcast communications from the streetlight modules to the vehicle.

8. The system of claim 6, wherein the extranet communication network is configured to facilitate two-way communications between the streetlight modules and the vehicle.

9. The system of claim 1, wherein the streetlight modules are configured to monitor traffic congestion within the zones along the road.

10. The system of claim 1, wherein the streetlight modules are configured to alert emergency services when a hazard is detected along the road.

11. The system of claim 1, wherein the streetlight modules are configured to generate an alert if an unsafe event is detected along the road.

12. The system of claim 1, wherein the streetlight modules are configured to alert the vehicle when at least one of the objects is moving towards a travel path of the vehicle.

13. The system of claim 12, wherein the vehicle includes an autonomous vehicle.

14. The system of claim 1, wherein the streetlight modules are configured to monitor the zones for an amber alert vehicle matching an amber alert description.

15. The system of claim 14, wherein the streetlight modules are configured to monitor license plates of vehicles via the camera to detect the amber alert vehicle matching the amber alert description.

16. The system of claim 1, further comprising:
a base station configured to store the tracking data from the streetlight modules.

17. The system of claim 1, wherein the streetlight modules are configured to manage traffic along the road via one or more traffic lights.

18. A method, comprising:
monitoring visually a first zone of a road with a first streetlight module;
monitoring visually a second zone of the road with a second streetlight module;
wherein the streetlight modules are part of a streetlight situational awareness system (SSAS);
wherein the streetlight modules are each integrated into a streetlight configured to illuminate the road;
wherein the streetlight modules each include a camera configured to visually monitor the zones;
tracking with the system an object as the object moves between the first zone and the second zone with the streetlight modules;
determining tracking data for the object with the system;
wherein the tracking data includes object type, object position, and object velocity;
transmitting the tracking data from the system to a vehicle travelling along the road;
wherein processing power of the vehicle for the determining the tracking data is offloaded to the streetlight modules; and
changing motion of the vehicle automatically in response to the tracking data from the system.

19. The method of claim 18, further comprising:
detecting a potential collision with the system by monitoring a travel path of the object with the streetlight modules; and
issuing an alert upon the detecting of the potential collision.

20. The method of claim 18, further comprising:
wherein the object includes the vehicle;
reading a license plate of the vehicle with the first streetlight module; and
determining with the system that the license plate matches a license plate identification for an amber alert.

21. A method, comprising:
monitoring visually a first zone of a road with a first streetlight module;
monitoring visually a second zone of the road with a second streetlight module;
wherein the streetlight modules are part of a streetlight situational awareness system (SSAS);
wherein the streetlight modules are each integrated into a streetlight configured to illuminate the road;
wherein the streetlight modules each include a camera configured to visually monitor the zones;
tracking with the system an object as the object moves between the first zone and the second zone with the streetlight modules;
monitoring with a vehicle travelling along the road for hazards in a direct line of sight of the vehicle;
determining tracking data for the object with the system;
wherein the object is located outside of the direct line of sight of the vehicle;
transmitting the tracking data from the system to the vehicle travelling along the road; and
changing motion of the vehicle automatically in response to the tracking data from the system for the object that is located outside of the direct line of sight of the vehicle.

22. The system of claim 1, wherein:
the vehicle is configured to analyze for hazards and/or objects within a direct line of sight of the vehicle;
the streetlight modules are configured monitor an area around the vehicle for hazards and/or objects outside of the direct line of sight of the vehicle;
the controller is configured to determine tracking data for the hazards and/or objects outside of the direct line of sight of the vehicle; and
the vehicle is configured to change navigation of the vehicle based on the tracking data from the streetlight modules.

23. A streetlight situational awareness system (SSAS), comprising:
two or more streetlight modules configured to visually monitor corresponding zones along a road;
wherein the streetlight modules are each integrated into a streetlight configured to illuminate the road;
wherein the streetlight modules each include a camera configured to visually monitor the zones;
a vehicle travelling along the road;
wherein the vehicle is configured to analyze for hazards and/or objects within a direct line of sight of the vehicle;
wherein the streetlight modules are configured monitor an area around the vehicle for hazards and/or objects outside of the direct line of sight of the vehicle;
wherein the streetlight modules each include a controller configured to determine tracking data for the hazards and/or objects outside of the direct line of sight of the vehicle;
wherein the streetlight modules each include a radio transceiver;
wherein the radio transceiver is configured to transmit the tracking data to the vehicle; and
wherein the vehicle is configured to change navigation of the vehicle based on the tracking data from the streetlight modules.

* * * * *